United States Patent
Suzuki et al.

(10) Patent No.: US 11,201,703 B2
(45) Date of Patent: Dec. 14, 2021

(54) COMMUNICATION SYSTEM

(71) Applicant: Mitsubishi Electric Corporation, Chiyoda-ku (JP)

(72) Inventors: Kuniyuki Suzuki, Tokyo (JP); Masayuki Nakazawa, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 16/468,595

(22) PCT Filed: Dec. 21, 2017

(86) PCT No.: PCT/JP2017/045842
§ 371 (c)(1),
(2) Date: Jun. 11, 2019

(87) PCT Pub. No.: WO2018/117200
PCT Pub. Date: Jun. 28, 2018

(65) Prior Publication Data
US 2020/0083995 A1 Mar. 12, 2020

(30) Foreign Application Priority Data
Dec. 21, 2016 (JP) .............................. JP2016-247576

(51) Int. Cl.
*H04L 5/00* (2006.01)
*H04L 27/26* (2006.01)
*H04W 72/04* (2009.01)

(52) U.S. Cl.
CPC .......... *H04L 5/0007* (2013.01); *H04L 5/0048* (2013.01); *H04L 27/2607* (2013.01); *H04L 27/2613* (2013.01); *H04W 72/042* (2013.01)

(58) Field of Classification Search
CPC ............... H04L 27/2628; H04L 27/265; H04L 27/2634; H04L 27/2678; H04L 5/0007;
(Continued)

(56) References Cited

U.S. PATENT DOCUMENTS

| | | | |
|---|---|---|---|
| 2007/0189406 A1* | 8/2007 | Kim ................. | H04L 27/2613 375/260 |
| 2009/0004971 A1* | 1/2009 | Dateki ............... | H04L 27/2607 455/62 |

(Continued)

FOREIGN PATENT DOCUMENTS

| EP | 2 385 733 A1 | 11/2011 | |
|---|---|---|---|
| EP | 2385733 A1 * | 11/2011 | ........... H04B 7/0673 |

(Continued)

OTHER PUBLICATIONS

European Office Action dated Jun. 19, 2020, issued in European Patent Application No. 17884101.1.
(Continued)

*Primary Examiner* — Ashley Shivers
(74) *Attorney, Agent, or Firm* — Oblon, McClelland, Maier & Neustadt, L.L.P.

(57) ABSTRACT

Provided is a technology capable of securing communication quality without providing an additional function such as phase correction. A base station device and a communication terminal device when operating as a transmitting device rotate inverse fast Fourier transform (IFFT) output, and copy a last portion of the rotated IFFT output to a head of the rotated IFFT output as a cyclic prefix (CP) to thereby generate a transmission signal so that there is no phase rotation at a head of a demodulation reception window set in a receiving device.

4 Claims, 18 Drawing Sheets

(58) Field of Classification Search
CPC .............. H04L 5/0048; H04L 27/2607; H04L 27/2613; H04L 27/26025; H04L 5/001; H04L 5/1469; H04L 27/2695; H04L 27/2665; H04L 27/2646; H04L 27/26; H04L 27/26524; H04L 27/26526; H04L 27/26532; H04L 27/26534; H04L 27/26536; H04L 27/26538; H04L 27/2654; H04L 27/26542; H04L 27/26544; H04L 27/26546; H04L 27/2636; H04L 27/26362; H04W 72/042; H04W 72/04

See application file for complete search history.

(56) References Cited

U.S. PATENT DOCUMENTS

| | | |
|---|---|---|
| 2009/0245222 A1 | 10/2009 | Sampath et al. |
| 2011/0038249 A1 | 2/2011 | Tamaki et al. |
| 2013/0022019 A1 | 1/2013 | Han et al. |
| 2014/0169346 A1 | 6/2014 | Futaki |
| 2015/0289275 A1* | 10/2015 | Nakamura ........ H04W 72/0466 370/335 |

FOREIGN PATENT DOCUMENTS

| | | |
|---|---|---|
| JP | 2011-523517 A | 8/2011 |
| JP | 2013-528978 A | 7/2013 |
| WO | WO 2009/122787 A1 | 10/2009 |
| WO | WO 2009/123878 A1 | 10/2009 |
| WO | WO 2013/018291 A1 | 2/2013 |

OTHER PUBLICATIONS

International Search Report dated Mar. 20, 2018 in PCT/JP2017/045842 filed on Dec. 21, 2017.

3GPP TS 36.300 V13.0.0, Jun. 2015, $3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13), pp. 1-254.

3GPP TSSG-SA1 #42, S1-083461, "LS on HNB/HeNB Open Access Mode", 3GPP SA WG1, Oct. 2008, 2 pages.

3GPP TR 36.814 V9.0.0, Mar. 2010, $3^{rd}$ Generation Partnership Project; Technical Specification Group Radio Access Network; Evolved Universal Terrestrial Radio Access (E-UTRA); Further advancements for E-UTRA physical layer aspects (Release 9), pp. 1-104.

3GPP TR 36.912 V10.0.0, Mar. 2011, $3^{rd}$ Generation Partnership Project; Technical Specification Group Radio Access Network; Feasibility study for Further Advancements for E-UTRA (LTE-Advanced) (Release 10), 252 pages.

3GPP TR 36.897 V13.0.0, Jun. 2015, $3^{rd}$ Generation Partnership Project; Technical Specification Group Radio Access Network; Study on elevation beamforming / Full-Dimension (FD) Multiple Input Multiple Output (MIMO) for LTE (Release 13), 200 pages.

"Scenarios, requirements and KPIs for 5G mobile and wireless system", [online], Apr. 2013, ICT-317669-METIS/D1.1, Internet: https://www.metis2020.com/documents/deliverables, 84 pages.

Extended European Search Report dated Sep. 21, 2020 in Patent Application No. 17884101.1, 11 pages.

* cited by examiner

F I G . 1
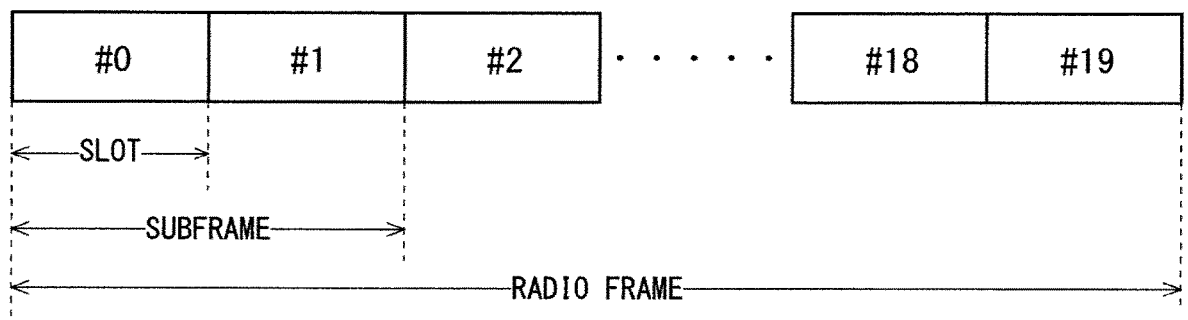

F I G . 6
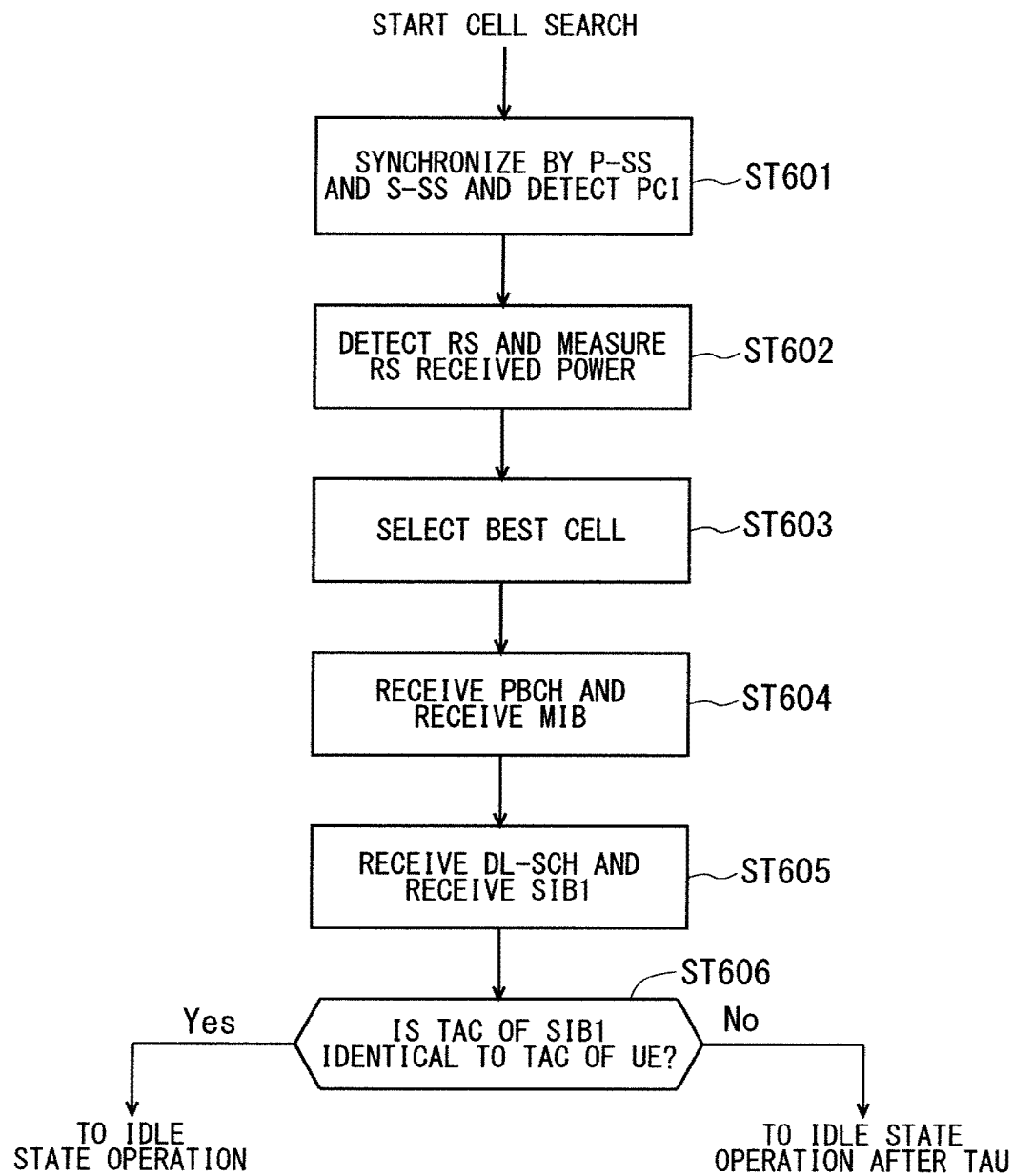

COMMUNICATION SYSTEM

TECHNICAL FIELD

The present invention relates to a communication system in which radio communication is performed between a communication terminal device such as a user equipment device and a base station device.

BACKGROUND ART

The 3rd generation partnership project (3GPP), the standard organization regarding the mobile communication system, is studying communication systems referred to as long term evolution (LTE) regarding radio sections and system architecture evolution (SAE) regarding the overall system configuration including a core network and a radio access network, which will be hereinafter collectively referred to as a network as well (for example, see Non-Patent Documents 1 to 4). This communication system is also referred to as 3.9 generation (3.9 G) system.

As the access scheme of the LTE, orthogonal frequency division multiplexing (OFDM) is used in a downlink direction and single carrier frequency division multiple access (SC-FDMA) is used in an uplink direction. Further, differently from the wideband code division multiple access (W-CDMA), circuit switching is not provided but a packet communication system is only provided in the LTE.

The decisions by 3GPP regarding the frame configuration in the LTE system described in Non-Patent Document 1 (Chapter 5) will be described with reference to FIG. 1. FIG. 1 is a diagram illustrating the configuration of a radio frame used in the LTE communication system. With reference to FIG. 1, one radio frame is 10 ms. The radio frame is divided into ten equally sized subframes. The subframe is divided into two equally sized slots. The first and sixth subframes contain a downlink synchronization signal per radio frame. The synchronization signals are classified into a primary synchronization signal (P-SS) and a secondary synchronization signal (S-SS).

Non-Patent Document 1 (Chapter 5) describes the decisions by 3GPP regarding the channel configuration in the LTE system. It is assumed that the same channel configuration is used in a closed subscriber group (CSG) cell as that of a non-CSG cell.

A physical broadcast channel (PBCH) is a channel for downlink transmission from a base station device (hereinafter may be simply referred to as a "base station") to a communication terminal device (hereinafter may be simply referred to as a "communication terminal") such as a user equipment device (hereinafter may be simply referred to as a "user equipment"). A BCH transport block is mapped to four subframes within a 40 ms interval. There is no explicit signaling indicating 40 ms timing.

A physical control format indicator channel (PCFICH) is a channel for downlink transmission from a base station to a communication terminal. The PCFICH notifies the number of orthogonal frequency division multiplexing (OFDM) symbols used for PDCCHs from the base station to the communication terminal. The PCFICH is transmitted per subframe.

A physical downlink control channel (PDCCH) is a channel for downlink transmission from a base station to a communication terminal. The PDCCH notifies the resource allocation information for downlink shared channel (DL-SCH) being one of the transport channels described below, resource allocation information for a paging channel (PCH) being one of the transport channels described below, and hybrid automatic repeat request (HARQ) information related to DL-SCH. The PDCCH carries an uplink scheduling grant. The PDCCH carries acknowledgement (Ack)/negative acknowledgement (Nack) that is a response signal to uplink transmission. The PDCCH is referred to as an L1/L2 control signal as well.

A physical downlink shared channel (PDSCH) is a channel for downlink transmission from a base station to a communication terminal. A downlink shared channel (DL-SCH) that is a transport channel and a PCH that is a transport channel are mapped to the PDSCH.

A physical multicast channel (PMCH) is a channel for downlink transmission from a base station to a communication terminal. A multicast channel (MCH) that is a transport channel is mapped to the PMCH.

A physical uplink control channel (PUCCH) is a channel for uplink transmission from a communication terminal to a base station. The PUCCH carries Ack/Nack that is a response signal to downlink transmission. The PUCCH carries a channel quality indicator (CQI) report. The CQI is quality information indicating the quality of received data or channel quality. In addition, the PUCCH carries a scheduling request (SR).

A physical uplink shared channel (PUSCH) is a channel for uplink transmission from a communication terminal to a base station. An uplink shared channel (UL-SCH) that is one of the transport channels is mapped to the PUSCH.

A physical hybrid ARQ indicator channel (PHICH) is a channel for downlink transmission from a base station to a communication terminal. The PHICH carries Ack/Nack that is a response signal to uplink transmission. A physical random access channel (PRACH) is a channel for uplink transmission from the communication terminal to the base station. The PRACH carries a random access preamble.

A downlink reference signal (RS) is a known symbol in the LTE communication system. The following five types of downlink reference signals are defined: a cell-specific reference signal (CRS), an MBSFN reference signal, a data demodulation reference signal (DM-RS) being a user equipment-specific reference signal (UE-specific reference signal), a positioning reference signal (PRS), and a channel state information reference signal (CSI-RS). The physical layer measurement objects of a communication terminal include reference signal received power (RSRP).

The transport channels described in Non-Patent Document 1 (Chapter 5) will be described. A broadcast channel (BCH) among the downlink transport channels is broadcast to the entire coverage of a base station (cell). The BCH is mapped to the physical broadcast channel (PBCH).

Retransmission control according to a hybrid ARQ (HARQ) is applied to a downlink shared channel (DL-SCH). The DL-SCH can be broadcast to the entire coverage of the base station (cell). The DL-SCH supports dynamic or semi-static resource allocation. The semi-static resource allocation is also referred to as persistent scheduling. The DL-SCH supports discontinuous reception (DRX) of a communication terminal for enabling the communication terminal to save power. The DL-SCH is mapped to the physical downlink shared channel (PDSCH).

The paging channel (PCH) supports DRX of the communication terminal for enabling the communication terminal to save power. The PCH is required to be broadcast to the entire coverage of the base station (cell). The PCH is mapped to physical resources such as the physical downlink shared channel (PDSCH) that can be used dynamically for traffic.

The multicast channel (MCH) is used for broadcast to the entire coverage of the base station (cell). The MCH supports SFN combining of multimedia broadcast multicast service (MBMS) services (MTCH and MCCH) in multi-cell transmission. The MCH supports semi-static resource allocation. The MCH is mapped to the PMCH.

Retransmission control according to a hybrid ARQ (HARQ) is applied to an uplink shared channel (UL-SCH) among the uplink transport channels. The UL-SCH supports dynamic or semi-static resource allocation. The UL-SCH is mapped to the physical uplink shared channel (PUSCH).

A random access channel (RACH) is limited to control information. The RACH involves a collision risk. The RACH is mapped to the physical random access channel (PRACH).

The HARQ will be described. The HARQ is the technique for improving the communication quality of a channel by combination of automatic repeat request (ARQ) and error correction (forward error correction). The HARQ is advantageous in that error correction functions effectively by retransmission even for a channel whose communication quality changes. In particular, it is also possible to achieve further quality improvement in retransmission through combination of the reception results of the first transmission and the reception results of the retransmission.

An example of the retransmission method will be described. If the receiver fails to successfully decode the received data, in other words, if a cyclic redundancy check (CRC) error occurs (CRC=NG), the receiver transmits "Nack" to the transmitter. The transmitter that has received "Nack" retransmits the data. If the receiver successfully decodes the received data, in other words, if a CRC error does not occur (CRC=OK), the receiver transmits "AcK" to the transmitter. The transmitter that has received "Ack" transmits the next data.

The logical channels described in Non-Patent Document 1 (Chapter 6) will be described. A broadcast control channel (BCCH) is a downlink channel for broadcast system control information. The BCCH that is a logical channel is mapped to the broadcast channel (BCH) or downlink shared channel (DL-SCH) that is a transport channel.

A paging control channel (PCCH) is a downlink channel for transmitting paging information and system information change notifications. The PCCH is used when the network does not know the cell location of a communication terminal. The PCCH that is a logical channel is mapped to the paging channel (PCH) that is a transport channel.

A common control channel (CCCH) is a channel for transmission control information between communication terminals and a base station. The CCCH is used in the case where the communication terminals have no RRC connection with the network. In the downlink direction, the CCCH is mapped to the downlink shared channel (DL-SCH) that is a transport channel. In the uplink direction, the CCCH is mapped to the uplink shared channel (UL-SCH) that is a transport channel.

A multicast control channel (MCCH) is a downlink channel for point-to-multipoint transmission. The MCCH is used for transmission of MBMS control information for one or several MTCHs from a network to a communication terminal. The MCCH is used only by a communication terminal during reception of the MBMS. The MCCH is mapped to the multicast channel (MCH) that is a transport channel.

A dedicated control channel (DCCH) is a channel that transmits dedicated control information between a communication terminal and a network on a point-to-point basis. The DCCH is used when the communication terminal has an RRC connection. The DCCH is mapped to the uplink shared channel (UL-SCH) in uplink and mapped to the downlink shared channel (DL-SCH) in downlink.

A dedicated traffic channel (DTCH) is a point-to-point communication channel for transmission of user information to a dedicated communication terminal. The DTCH exists in uplink as well as downlink. The DTCH is mapped to the uplink shared channel (VL-SCH) in uplink and mapped to the downlink shared channel (DL-SCH) in downlink.

A multicast traffic channel (MTCH) is a downlink channel for traffic data transmission from a network to a communication terminal. The MTCH is a channel used only by a communication terminal during reception of the MBMS. The MTCH is mapped to the multicast channel (MCH).

CGI represents a cell global identifier. ECGI represents an E-UTRAN cell global identifier. A closed subscriber group (CSG) cell is introduced in the LTE, and the long term evolution advanced (LTE-A) and universal mobile telecommunication system (UMTS) described below.

The closed subscriber group (CSG) cell is a cell in which subscribers who are allowed use are specified by an operator (hereinafter, also referred to as a "cell for specific subscribers"). The specified subscribers are allowed to access one or more cells of a public land mobile network (PLMN). One or more cells to which the specified subscribers are allowed access are referred to as "CSG cell(s)". Note that access is limited in the PLMN.

The CSG cell is part of the PLMN that broadcasts a specific CSG identity (CSG ID) and broadcasts "TRUE" in a CSG indication. The authorized members of the subscriber group who have registered in advance access the CSG cells using the CSG ID that is the access permission information.

The CSG ID is broadcast by the CSG cell or cells. A plurality of CSG IDs exist in the LTE communication system. The CSG IDs are used by user equipments (UEs) for making access from CSG-related members easier.

The locations of communication terminals are tracked based on an area composed of one or more cells. The locations are tracked for enabling tracking the locations of communication terminals and calling communication terminals, in other words, incoming calling to communication terminals even in an idle state. An area for tracking locations of communication terminals is referred to as a tracking area.

3GPP is studying base stations referred to as Home-NodeB (Home-NB; HNB) and Home-eNodeB (Home-eNB; HeNB). HNB/HeNB is a base station for, for example, household, corporation, or commercial access service in UTRAN/E-UTRAN. Non-Patent Document 2 discloses three different modes of the access to the HeNB and HNB. Specifically, an open access mode, a closed access mode, and a hybrid access mode are disclosed.

Further, 3GPP is pursuing specifications standard of long term evolution advanced (LTE-A) as Release 10 (see Non-Patent Documents 3 and 4). The LTE-A is based on the LTE radio communication system and is configured by adding several new techniques to the system.

Carrier aggregation (CA) is studied for the LTE-A system, in which two or more component carriers (CCs) are aggregated to support wider transmission bandwidths up to 100 MHz. Non-Patent Document 1 describes the CA.

In the case where CA is configured, a user equipment has a single RRC connection with a network (NW). In RRC connection, one serving cell provides NAS mobility information and security input. This cell is referred to as a primary cell (PCell). In downlink, a carrier corresponding to PCell is a downlink primary component carrier (DL PCC).

In uplink, a carrier corresponding to PCell is an uplink primary component carrier (UL PCC).

A secondary cell (SCell) is configured to form a serving cell group with a PCell, in accordance with the user equipment capability. In downlink, a carrier corresponding to SCell is a downlink secondary component carrier (DL SCC). In uplink, a carrier corresponding to SCell is an uplink secondary component carrier (UL SCC).

A serving cell group of one PCell and one or more SCells is configured for one UE.

The new techniques in the LTE-A include the technique of supporting wider bands (wider bandwidth extension) and the coordinated multiple point transmission and reception (CoMP) technique. The CoMP studied for LTE-A in 3GPP is described in Non-Patent Document 1.

The traffic flow of a mobile network is on the rise, and the communication rate is also increasing. It is expected that the communication rate will be further increased when the operations of the LTE and the LTE-A are fully initiated.

Furthermore, 3GPP is studying the use of small eNBs (hereinafter also referred to as "small-scale base station devices") configuring small cells to satisfy tremendous traffic in the future. In an example technique under study, etc., a large number of small eNBs will be installed to configure a large number of small cells, thus increasing spectral efficiency and communication capacity. The specific techniques include dual connectivity (abbreviated as DC) in which a user equipment communicates with two eNBs through connection thereto. Non-Patent Document 1 describes the DC.

Among eNBs that perform dual connectivity (DC), one of them may be referred to as a master eNB (abbreviated as MeNB), and the other may be referred to as a secondary eNB (abbreviated as SeNB).

For increasingly sophisticated mobile communications, the fifth generation (hereinafter also referred to as "5G") radio access system is studied, whose service is aimed to be launched in 2020 and afterward. For example, in the Europe, an organization named METIS summarizes the requirements for 5G (see Non-Patent Document 5).

Among the requirements in the 5G radio access system are a system capacity 1000 times as high as, a data transmission rate 100 times as high as, a data latency one tenth (1/10) as low as, and simultaneously connected communication terminals 100 times as many as those in the LTE system, to further reduce the power consumption and device cost.

To satisfy such requirements, increasing the transmission capacity of data using broadband frequencies, and increasing the transmission rate of data through increase in the spectral efficiency are being studied. To realize these, the techniques enabling the spatial multiplexing such as the Multiple Input Multiple Output (MIMO) and the beamforming using a multi-element antenna are being studied.

The MIMO is continuously studied also in LTE-A. From Release 13, full dimension (FD)-MIMO is studied as the extension of the MIMO, which uses two-dimensional antenna array. Non-Patent Document 6 describes the FD-MIMO.

It is studied that the 5G radio access system will be installed concurrently with the LTE system in the initial period of the launch of its service, which is scheduled in 2020. The following configuration is considered. Specifically, an LTE base station and a 5G base station are connected in a DC configuration, and the LTE base station is regarded as an MeNB and the 5G base station as an SeNB. C-plane data is processed in the LTE base station having a large cell range, and U-plane is processed in the LTE base station and the 5G base station.

PRIOR ART DOCUMENTS

Non-Patent Documents

Non-Patent Document 1: 3GPP TS36.300 V13.0.0
Non-Patent Document 2: 3GPP S1-083461
Non-Patent Document 3: 3GPP TR 36.814 V9.0.0
Non-Patent Document 4: 3GPP TR 36.912 V10.0.0
Non-Patent Document 5: "Scenarios, requirements and KPIs for 5G mobile and wireless system", [online], Apr. 30, 2013, ICT-317669-METIS/D1.1, [Searched on Jan. 25, 2016], Internet https://www.metis2020.com/documents/deliverables/Non-Patent Document 6: 3GPP TR36.897 V13.0.0

SUMMARY

Problem to be Solved by the Invention

Introduction of the 5G system has been studied. Since large-volume communication is required, further increase in the bandwidth (the size of CC) and further increase in a modulation level than ever have been studied, based on OFDM communication. Further, low-latency communication is also required, and extension of an OFDM sub-carrier interval (OFDM symbol 15 kHz→60 kHz×n, or 75 kHz×n) has been studied. Therefore, required accuracy of a phase error has been increased.

Meanwhile, in the conventional OFDM communication, a technology of copying a last portion of IFFT output to a head of the OFDM symbol after IFFT as a cyclic prefix (which may also be hereinafter referred to as CP) is known. According to this, even when a signal corresponding to an amount of one symbol time is taken out of any portion of a CP+OFDM symbol, fast Fourier transform (FFT), i.e., demodulation, can be performed. In general, the receiver sets approximately a center of a CP length as a demodulation start timing (i.e., a reception window head) in consideration of a control error.

There has hitherto been no problem with the above-mentioned method. However, as the required accuracy of a phase error is increased, the following problem occurs. Specifically, when the reception window head is deviated from the head of the OFDM symbol after IFFT, phase rotation occurs, and its phase rotation amount depends on frequency. Therefore, a difference of the phase rotation amount in every frequency reduces communication quality.

The present invention has an object to provide a technology capable of securing communication quality without providing an additional function such as phase correction.

Means to Solve the Problem

A communication system according to the present invention includes a base station device, and a communication terminal device configured to perform radio communication with the base station device. The base station device and the communication terminal device when operating as a transmitting device rotate inverse fast Fourier transform (IFFT) output, and copy a last portion of the rotated IFFT output to a head of the rotated IFFT output as a cyclic prefix (CP) to thereby generate a transmission signal so that there is no phase rotation at a head of a demodulation reception window set in a receiving device.

Effects of the Invention

According to the communication system of the present invention, communication quality can be secured without providing an additional function such as phase correction.

These and other objects, features, aspects and advantages of the present invention will become more apparent from the following detailed description of the present invention when taken in conjunction with the accompanying drawings.

BRIEF DESCRIPTION OF DRAWINGS

FIG. 1 is a diagram illustrating the configuration of a radio frame for use in an LTE communication system.

FIG. 6 is a flowchart showing an outline from a cell search to an idle state operation performed by a user equipment (UE) in the LTE communication system.

DESCRIPTION OF EMBODIMENTS

First Embodiment

Figure 2:
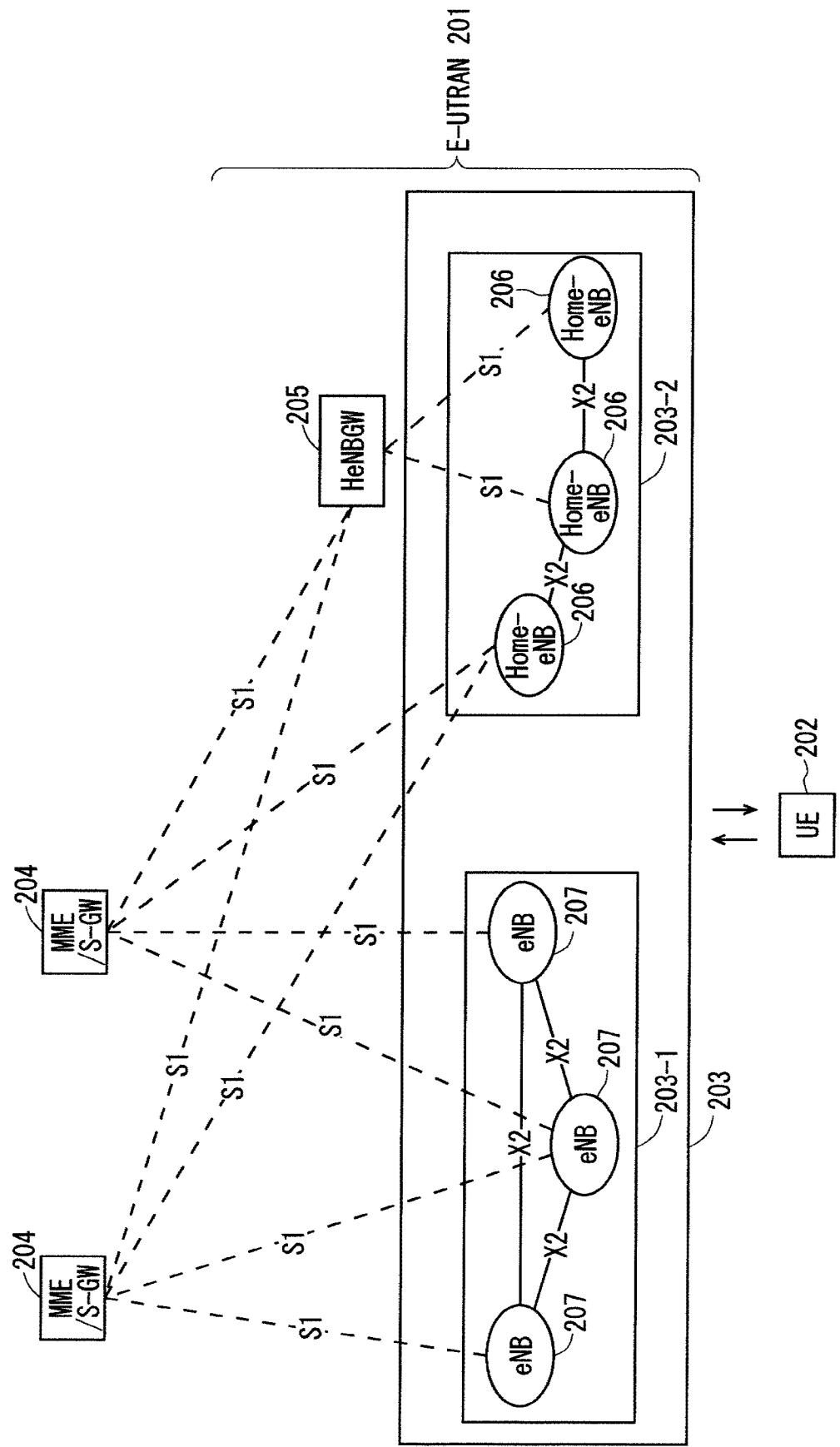
FIG. 2 is a block diagram showing the overall configuration of an LTE communication system 200 under discussion of 3GPP.

FIG. 2 is a block diagram showing an overall configuration of an LTE communication system 200, which is under discussion of 3GPP. FIG. 2 will be described. A radio access network is referred to as an evolved universal terrestrial radio access network (E-UTRAN) 201. A user equipment device (hereinafter, referred to as a "user equipment (UE)") 202 that is a communication terminal device is capable of radio communication with a base station device (hereinafter, referred to as a "base station (E-UTRAN Node B: eNB)") 203 and transmits and receives signals through radio communication.

Here, the "communication terminal device" covers not only a user equipment device such as a movable mobile phone terminal device, but also an unmovable device such as a sensor. In the following description, the "communication terminal device" may be simply referred to as a "communication terminal".

The E-UTRAN is composed of one or a plurality of base stations 203, provided that a control protocol for the user equipment 202 such as a radio resource control (RRC), and user planes such as a packet data convergence protocol (PDCP), radio link control (RLC), medium access control (MAC), or physical layer (PHY) are terminated in the base station 203.

The control protocol radio resource control (RRC) between the user equipment 202 and the base station 203 performs broadcast, paging, RRC connection management, and the like. The states of the base station 203 and the user equipment 202 in RRC are classified into RRC_IDLE and RRC_CONNECTED.

In RRC_IDLE, public land mobile network (PLMN) selection, system information (SI) broadcast, paging, cell re-selection, mobility, and the like are performed. In RRC_CONNECTED, the user equipment has RRC connection and is capable of transmitting and receiving data to and from a network. In RRC_CONNECTED, for example, handover (HO) and measurement of a neighbor cell are performed.

The base stations 203 are classified into eNBs 207 and Home-eNBs 206. The communication system 200 includes an eNB group 203-1 including a plurality of eNBs 207 and a Home-eNB group 203-2 including a plurality of HomeeNBs 206. A system, composed of an evolved packet core (EPC) being a core network and an E-UTRAN 201 being a radio access network, is referred to as an evolved packet system (EPS). The EPC being a core network and the E-UTRAN 201 being a radio access network may be collectively referred to as a "network".

The eNB 207 is connected to an MME/S-GW unit (hereinafter, also referred to as an "MME unit") 204 including a mobility management entity (MME), a serving gateway (S-GW), or an MME and an S-GW by means of an Si interface, and control information is communicated between the eNB 207 and the MME unit 204. A plurality of MME units 204 may be connected to one eNB 207. The eNBs 207 are connected to each other by means of an X2 interface, and control information is communicated between the eNBs 207.

The Home-eNB 206 is connected to the MME unit 204 by means of an S1 interface, and control information is communicated between the Home-eNB 206 and the MME unit 204. A plurality of Home-eNBs 206 are connected to one MME unit 204. Or, the Home-eNBs 206 are connected to the MME units 204 through a Home-eNB gateway (HeNBGW) 205. The Home-eNB 206 is connected to the HeNBGW 205 by means of an S1 interface, and the HeNBGW 205 is connected to the MME unit 204 by means of an S1 interface.

One or a plurality of Home-eNBs 206 are connected to one HeNBGW 205, and information is communicated therebetween through an S1 interface. The HeNBGW 205 is connected to one or a plurality of MME units 204, and information is communicated therebetween through an S1 interface.

The MME units 204 and HeNBGW 205 are entities of higher layer, specifically, higher nodes, and control the connections between the user equipment (UE) 202 and the eNB 207 and the Home-eNB 206 being base stations. The MME units 204 configure an EPC being a core network. The base station 203 and the HeNBGW 205 configure the E-UTRAN 201.

Further, 3GPP is studying the configuration below. The X2 interface between the Home-eNBs 206 is supported. In other words, the Home-eNBs 206 are connected to each other by means of an X2 interface, and control information is communicated between the Home-eNBs 206. The HeNBGW 205 appears to the MME unit 204 as the Home-eNB 206. The HeNBGW 205 appears to the Home-eNB 206 as the MME unit 204.

The interfaces between the Home-eNBs 206 and the MME units 204 are the same, which are the S1 interfaces, in both cases where the Home-eNB 206 is connected to the MME unit 204 through the HeNBGW 205 and it is directly connected to the MME unit 204.

The base station 203 may configure a single cell or a plurality of cells. Each cell has a range predetermined as a coverage in which the cell can communicate with the user equipment 202 and performs radio communication with the user equipment 202 within the coverage. In the case where one base station 203 configures a plurality of cells, every cell is configured so as to communicate with the user equipment 202.

Figure 3:
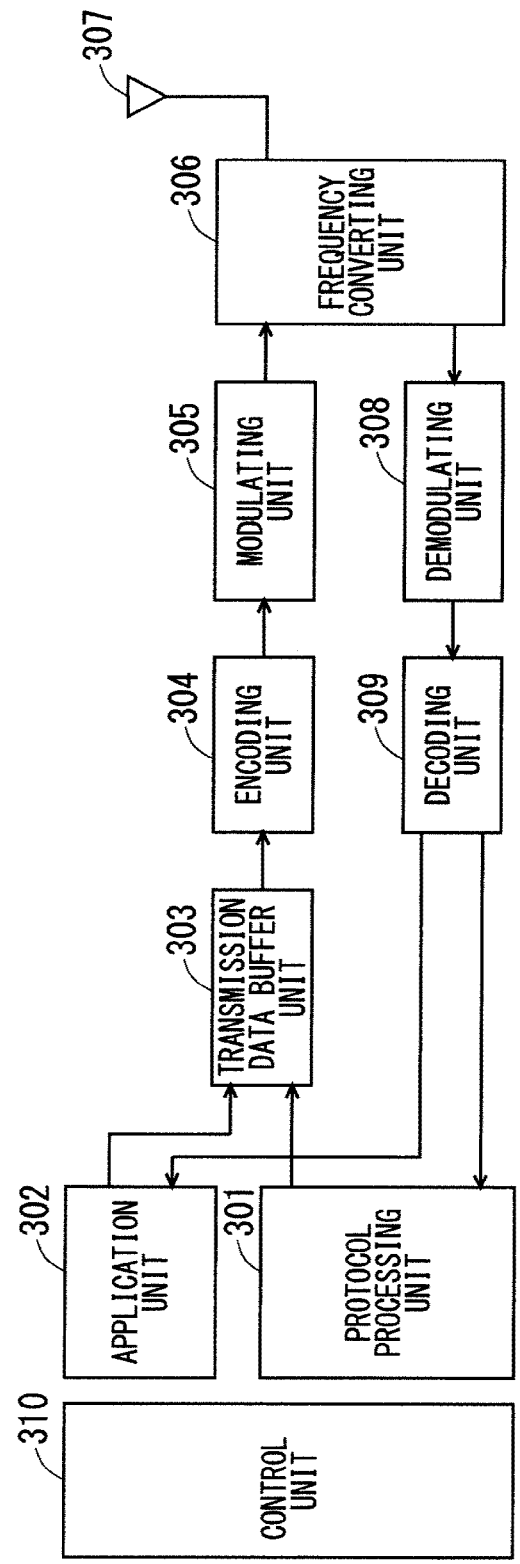
FIG. 3 is a block diagram showing the configuration of a user equipment 202 shown in FIG. 2, which is a communication terminal according to the present invention.

FIG. 3 is a block diagram showing the configuration of the user equipment 202 of FIG. 2 that is a communication terminal according to the present invention. The transmission process of the user equipment 202 shown in FIG. 3 will be described. First, a transmission data buffer unit 303 stores the control data from a protocol processing unit 301 and the user data from an application unit 302. The data stored in the transmission data buffer unit 303 is passed to an encoding unit 304 and is subjected to an encoding process such as error correction. There may exist the data output from the transmission data buffer unit 303 directly to a modulating unit 305 without the encoding process. The data encoded by the encoding unit 304 is modulated by the modulating unit 305. The modulated data is converted into a baseband signal, and the baseband signal is output to a frequency converting unit 306 and is then converted into a radio transmission frequency. After that, a transmission signal is transmitted from an antenna 307 to the base station 203.

The user equipment 202 executes the reception process as follows. The radio signal from the base station 203 is received through the antenna 307. The received signal is converted from a radio reception frequency into a baseband signal by the frequency converting unit 306 and is then demodulated by a demodulating unit 308. The demodulated data is passed to a decoding unit 309 and is subjected to a decoding process such as error correction. Among the pieces of decoded data, the control data is passed to the protocol processing unit 301, and the user data is passed to the application unit 302.

A series of processes by the user equipment 202 is controlled by a control unit 310. This means that, though not shown in FIG. 3, the control unit 310 is connected to the individual units 301 to 309.

Figure 4:
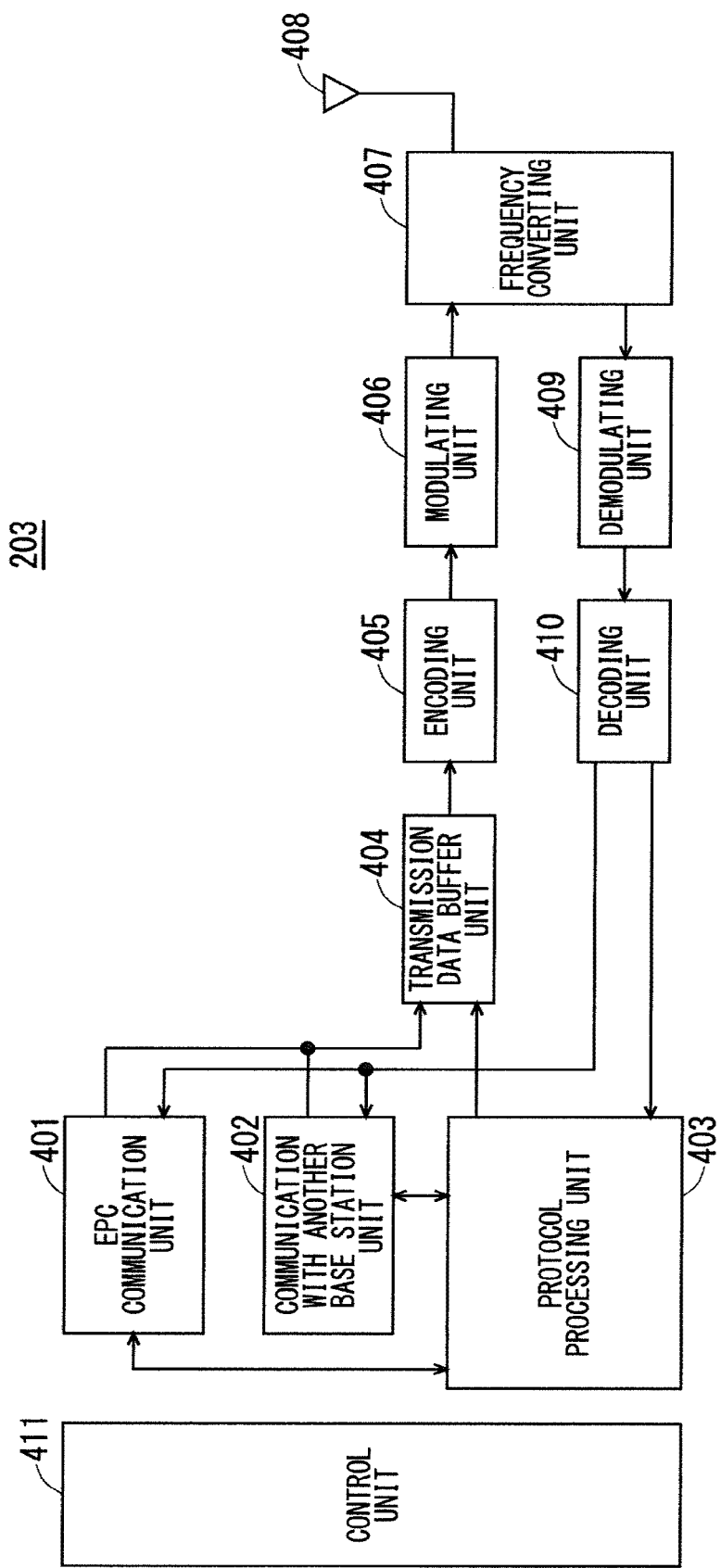
FIG. 4 is a block diagram showing the configuration of a base station 203 shown in FIG. 2, which is a base station according to the present invention.

FIG. 4 is a block diagram showing the configuration of the base station 203 of FIG. 2 that is a base station according to the present invention. The transmission process of the base station 203 shown in FIG. 4 will be described. An EPC communication unit 401 performs data transmission and reception between the base station 203 and the EPC (such as the MME unit 204), HeNBGW 205, and the like. A communication with another base station unit 402 performs data transmission and reception to and from another base station. The EPC communication unit 401 and the communication with another base station unit 402 each transmit and receive information to and from a protocol processing unit 403. The control data from the protocol processing unit 403, and the user data and the control data from the EPC communication unit 401 and the communication with another base station unit 402 are stored in a transmission data buffer unit 404.

The data stored in the transmission data buffer unit 404 is passed to an encoding unit 405 and is then subjected to an encoding process such as error correction. There may exist the data output from the transmission data buffer unit 404 directly to a modulating unit 406 without the encoding process. The encoded data is modulated by the modulating unit 406. The modulated data is converted into a baseband signal, and the baseband signal is output to a frequency converting unit 407 and is then converted into a radio transmission frequency. After that, a transmission signal is transmitted from an antenna 408 to one or a plurality of user equipments 202.

The reception process of the base station 203 is executed as follows. A radio signal from one or a plurality of user equipments 202 is received through the antenna 408. The received signal is converted from a radio reception frequency into a baseband signal by the frequency converting unit 407, and is then demodulated by a demodulating unit 409. The demodulated data is passed to a decoding unit 410 and is then subjected to a decoding process such as error correction. Among the pieces of decoded data, the control data is passed to the protocol processing unit 403, the EPC communication unit 401, or the communication with another base station unit 402, and the user data is passed to the EPC communication unit 401 and the communication with another base station unit 402.

A series of processes by the base station 203 is controlled by a control unit 411. This means that, though not shown in FIG. 4, the control unit 411 is connected to the individual units 401 to 410.

Figure 5:
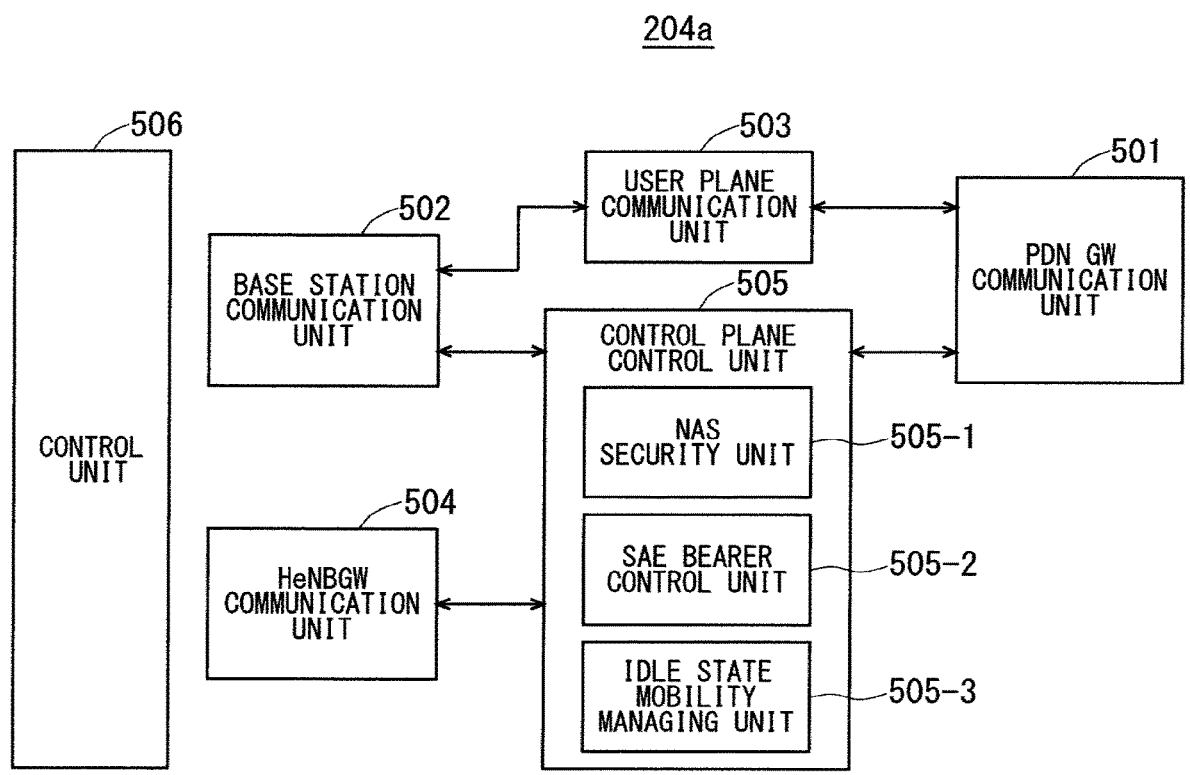
FIG. 5 is a block diagram showing the configuration of an MME according to the present invention.

FIG. 5 is a block diagram showing the configuration of the MME according to the present invention. FIG. 5 shows the configuration of an MME 204a included in the MME unit 204 shown in FIG. 2 described above. A PDN GW communication unit 501 performs data transmission and reception between the MME 204a and the PDN GW. A base station communication unit 502 performs data transmission and reception between the MME 204a and the base station 203 by means of the S1 interface. In the case where the data received from the PDN GW is user data, the user data is passed from the PDN GW communication unit 501 to the base station communication unit 502 via a user plane communication unit 503 and is then transmitted to one or a plurality of base stations 203. In the case where the data received from the base station 203 is user data, the user data is passed from the base station communication unit 502 to the PDN GW communication unit 501 via the user plane communication unit 503 and is then transmitted to the PDN GW.

In the case where the data received from the PDN GW is control data, the control data is passed from the PDN GW communication unit 501 to a control plane control unit 505. In the case where the data received from the base station 203 is control data, the control data is passed from the base station communication unit 502 to the control plane control unit 505.

A HeNBGW communication unit 504 is provided in the case where the HeNBGW 205 is provided, which performs data transmission and reception between the MME 204a and the HeNBGW 205 by means of the interface (IF) according to an information type. The control data received from the HeNBGW communication unit 504 is passed from the HeNBGW communication unit 504 to the control plane control unit 505. The processing results of the control plane control unit 505 are transmitted to the PDN GW via the PDN GW communication unit 501. The processing results of the control plane control unit 505 are transmitted to one or a plurality of base stations 203 by means of the S1 interface via the base station communication unit 502, and are transmitted to one or a plurality of HeNBGWs 205 via the HeNBGW communication unit 504.

The control plane control unit 505 includes a NAS security unit 505-1, an SAE bearer control unit 505-2, and an idle state mobility managing unit 505-3, and performs an overall process for the control plane. The NAS security unit 505-1 provides, for example, security of a non-access stratum (NAS) message. The SAE bearer control unit 505-2 manages, for example, a system architecture evolution (SAE) bearer. The idle state mobility managing unit 505-3 performs, for example, mobility management of an idle state (LTE-IDLE state, which is merely referred to as idle as well), generation and control of a paging signal in the idle state, addition, deletion, update, and search of a tracking area of one or a plurality of user equipments 202 being served thereby, and tracking area list management.

The MME 204a distributes a paging signal to one or a plurality of base stations 203. In addition, the MME 204a performs mobility control of an idle state. When the user equipment is in the idle state and an active state, the MME 204a manages a list of tracking areas. The MME 204a begins a paging protocol by transmitting a paging message to the cell belonging to a tracking area in which the UE is registered. The idle state mobility managing unit 505-3 may manage the CSG of the Home-eNBs 206 to be connected to the MME 204a, CSG IDs, and a whitelist.

An example of a cell search method in a mobile communication system will be described next. FIG. 6 is a flowchart showing an outline from a cell search to an idle state operation performed by a communication terminal (UE) in the LTE communication system. When starting a cell search, in Step ST601, the communication terminal synchronizes slot timing and frame timing by a primary synchronization signal (P-SS) and a secondary synchronization signal (S-SS) transmitted from a neighbor base station.

The P-SS and S-SS are collectively referred to as a synchronization signal (SS). Synchronization codes, which correspond one-to-one to PCIs assigned per cell, are assigned to the synchronization signals (SSs). The number of PCIs is currently studied in 504 ways. The 504 ways of PCIs are used for synchronization, and the PCIs of the synchronized cells are detected (specified).

In Step ST602, next, the user equipment detects a cell-specific reference signal (CRS) being a reference signal (RS) transmitted from the base station per cell and measures the reference signal received power (RSRP). The codes corresponding one-to-one to the PCIs are used for the reference signal RS. Separation from another cell is enabled by correlation using the code. The code for RS of the cell is derived from the PCI specified in Step ST601, so that the RS can be detected and the RS received power can be measured.

In Step ST603, next, the user equipment selects the cell having the best RS received quality, for example, the cell having the highest RS received power, that is, the best cell, from one or more cells that have been detected up to Step ST602.

In Step ST604, next, the user equipment receives the PBCH of the best cell and obtains the BCCH that is the broadcast information. A master information block (MIB) containing the cell configuration information is mapped to the BCCH over the PBCH. Accordingly, the MIB is obtained by obtaining the BCCH through reception of the PBCH. Examples of the MIB information include the downlink (DL) system bandwidth (also referred to as a transmission bandwidth configuration (dl-bandwidth)), the number of transmission antennas, and a system frame number (SFN).

In Step ST605, next, the user equipment receives the DL-SCH of the cell based on the cell configuration information of the MIB, to thereby obtain a system infomration block (SIB) 1 of the broadcast information BCCH. The SIB1 contains the information about the access to the cell, information about cell selection, and scheduling information on another SIB (SIBk; k is an integer equal to or greater than two). In addition, the SIB1 contains a tracking area code (TAC).

In Step ST606, next, the communication terminal compares the TAC of the SIB1 received in Step ST605 with the TAC portion of a tracking area identity (TAI) in the tracking area list that has already been possessed by the communication terminal. The tracking area list is also referred to as a TAI list. TAI is the identification information for identifying tracking areas and is composed of a mobile country code (MCC), a mobile network code (MNC), and a tracking area code (TAC). MCC is a country code. MNC is a network code. TAC is the code number of a tracking area.

If the result of the comparison of Step ST606 shows that the TAC received in Step ST605 is identical to the TAC included in the tracking area list, the user equipment enters an idle state operation in the cell. If the comparison shows that the TAC received in Step ST605 is not included in the tracking area list, the communication terminal requires a core network (EPC) including MME and the like to change a tracking area through the cell for performing tracking area update (TAU).

The device configuring a core network (hereinafter, also referred to as a "core-network-side device") updates the tracking area list based on an identification number (such as UE-ID) of a communication terminal transmitted from the communication terminal together with a TAU request signal. The core-network-side device transmits the updated tracking area list to the communication terminal. The communication terminal rewrites (updates) the TAC list of the communication terminal based on the received tracking area list. After that, the communication terminal enters the idle state operation in the cell.

An OFDM transmission method depending on a communication state, e.g., control of a head position of a reception window, will be described below.

Figure 7:
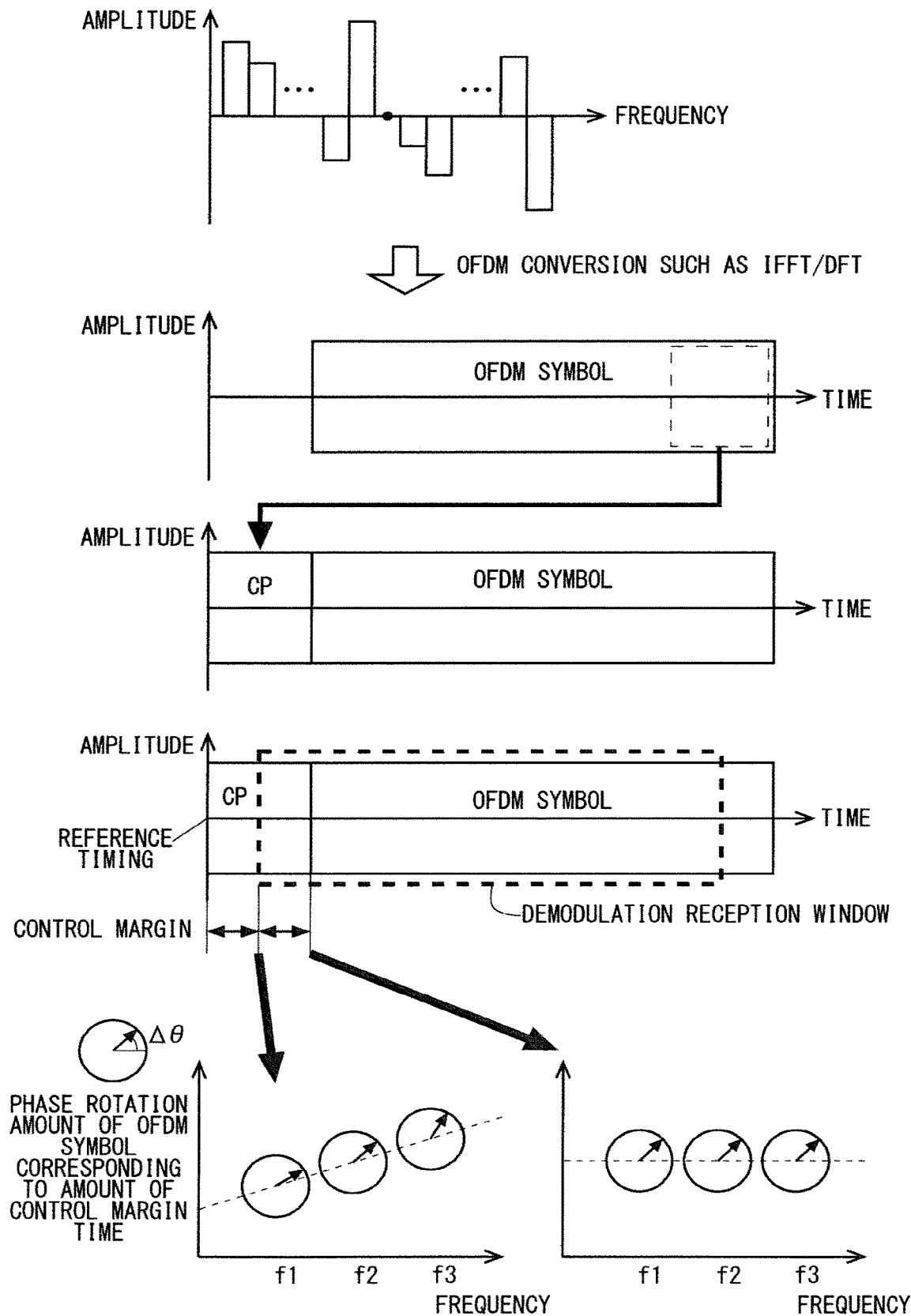
FIG. 7 is a diagram illustrating occurrence of phase rotation at a head of a demodulation reception window in OFDM.

A signal subjected to error correction processing in the encoding unit and rate matching processing for making the data number fit into a radio frame becomes an orthogonal frequency division multiplexing (OFDM) symbol in the modulating unit through modulation processing such as 64-QAM and 256-QAM and inverse fast Fourier transform (IFFT). As illustrated in FIG. 7, a technology of copying a last portion of IFFT output to a head of the OFDM symbol after IFFT as a cyclic prefix (which may also be hereinafter referred to as CP) is known. According to this, even when a signal corresponding to an amount of one symbol time is taken out of any portion of a CP+OFDM symbol, fast Fourier transform (FFT), i.e., demodulation, can be performed. Therefore, communication can be performed without causing an error of timing control of a demodulator of a receiver, an error of reception arrival time due to a distance between the user equipment and the base station, and interference between symbols due to delay spread of a multipath when the multipath occurs. In general, in order to avoid the above-mentioned timing error and interference between symbols, the receiver sets approximately a center of a CP length as a demodulation start timing (i.e., a reception window head), and performs timing advance (TA) control.

Here, signals after IFFT output from the same IFFT function unit have phases matching in every frequency at the head of data, but phase rotation occurs when the reception window head is deviated from the head of the data. Especially, as the frequency is higher, the phase rotation amount is larger at the same time. In view of this, in 5G, in order to achieve low-latency communication (data processing delay of 1/10 or less), increase in an OFDM symbol rate has been studied.

However, when a data size of a block (a resource block (RB) of LTE/LTE-A) specified by frequency and time is the same, a frequency bandwidth of the resource block is large, and frequency deviation in the resource block is also large. For example, when the OFDM symbol rate is changed from 15 kHz to 240 kHz, phase deviation multiplied by 240/15=16 is generated. Further, when 64-QAM and 256-QAM, which have a higher degree of modulation than QPSK, are used in order to achieve large-volume communication, it is known that a tolerable phase error is reduced.

From the above, there is a problem in that communication quality is reduced unless the receiver is provided with an additional function of accurately correcting the frequency deviation.

Further, when the OFDM symbol rate is increased in order to achieve low-latency communication (data processing delay of 1/10 or less), there is a problem in that overhead of CP is relatively large with respect to throughput.

<1-1>

In view of this, the first embodiment provides a technology for solving the problems as described above. Specifically, a technology of rotating an OFDM symbol (i.e., IFFT output) in advance to eliminate phase rotation in the reception window head in the receiver to thereby be capable of securing communication quality without providing an additional function such as phase correction is provided.

Figure 8:
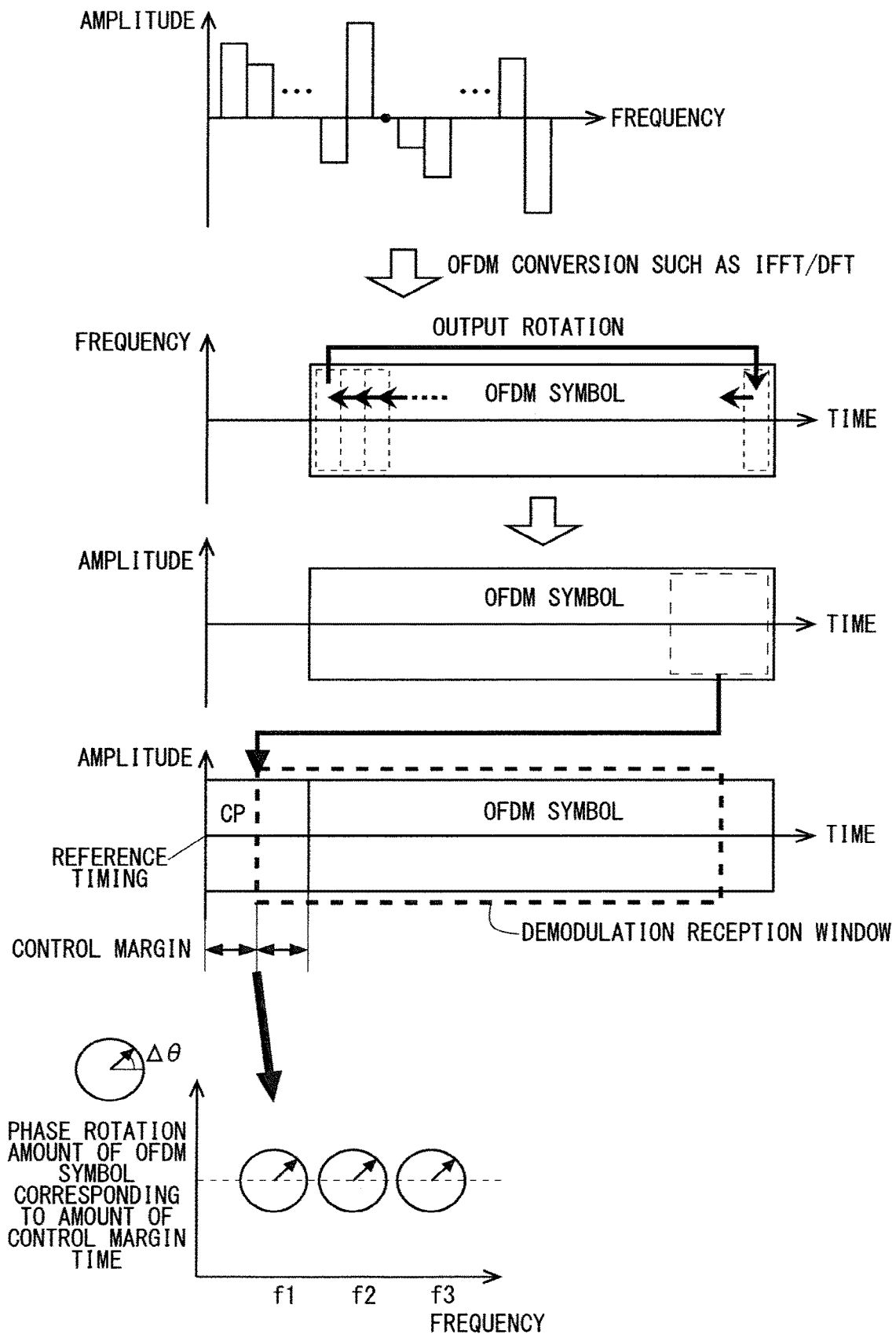
FIG. 8 is a diagram illustrating rotating IFFT output to match phases in every frequency at the head of the demodulation reception window according to a first embodiment.

Description will be given with reference to FIG. 8. The modulating unit performs modulation processing such as 64-QAM and 256-QAM and IFFT on the signal subjected to the error correction processing in the encoding unit and the rate matching processing for making the data number fit into a radio frame.

Then, the modulating unit rotates the IFFT output with the following first or second method. In the first method, a predetermined amount on the head side is rotated to an end side in the IFFT output to be transmitted at certain time. More specifically, when the IFFT output to be transmitted at certain time has 2048 points of IFFT(0) to IFFT(2047), rotation of IFFT(0)→IFFT(2047)→FFT(2046)→ ... →IFFT(1)→IFFT(0) is repeated a required number of times. In the second method, an input signal of IFFT is multiplied by $\exp(2\pi t/2048)$. Here, t is equal to the number of times of the above-mentioned repetition in the first method. In other words, the receiver rotates phase of a frequency component at the time of performing FFT from the reception window head.

After rotation is performed with the first or second method, a last portion of the OFDM symbol is copied as in the conventional technology to provide a CP. According to the above-mentioned rotation, when the receiver performs FFT demodulation, phases in every frequency at a head of a demodulation reception window match.

More specific examples of the rotation of the IFFT output will be described below.

(1) An amount of rotation of the IFFT output (i.e., the number of times of repetition) is determined as follows.

(1a) A rotation amount of the IFFT output is stored in advance as a system parameter in non-volatile memory of the base station. At the time of starting the system, the rotation amount is read out from the non-volatile memory, and the IFFT output is rotated based on the read out rotation amount.

In this case, when the base station notifies the user equipment of the rotation amount of the IFFT output as a system parameter through broadcast information, the parameter can be changed at required time such as when a corresponding cell radius of the base station is changed, and thus this is more effective. The user equipment adjusts the position of the reception window by an amount corresponding to the rotation amount obtained from the base station, and then performs demodulation.

Further, when the user equipment performs transmission to the base station, the user equipment rotates the IFFT output by using the above-mentioned rotation amount obtained from the base station, and then performs transmission. Note that the rotation amount at the time of transmission from the base station and the rotation amount at the time of transmission from the user equipment may be equal to each other.

(1b) Although the above-mentioned (1a) illustrates an example in which the rotation amount of the IFFT output is stored as a system parameter in the non-volatile memory of the base station, the rotation amount may be specified by a message from a higher-layer device of the base station, such as an operations, administration, and management (OAM)

server. According to this, when the parameter is changed, the parameter centrally managed in the OAM server may be changed. Specifically, the parameter need not be individually changed in all of the base stations.

(1c) Although the above-mentioned (1b) illustrates an example in which the rotation amount of the IFFT output is set by the OAM server, setting the rotation amount of the IFFT output by using a radio resource control (RRC) message is also effective. Here, for example, the RRC message corresponds to RRC Connection Reconfig transmitted from the base station to the user equipment to correspond to a Bearer Setup request from MME, or corresponds to RRC Connection Reconfig with which a handover command is transmitted at the time of handover. With use of the RCC message, the rotation amount of the IFFT output can be finely set for each user equipment.

Figure 9:
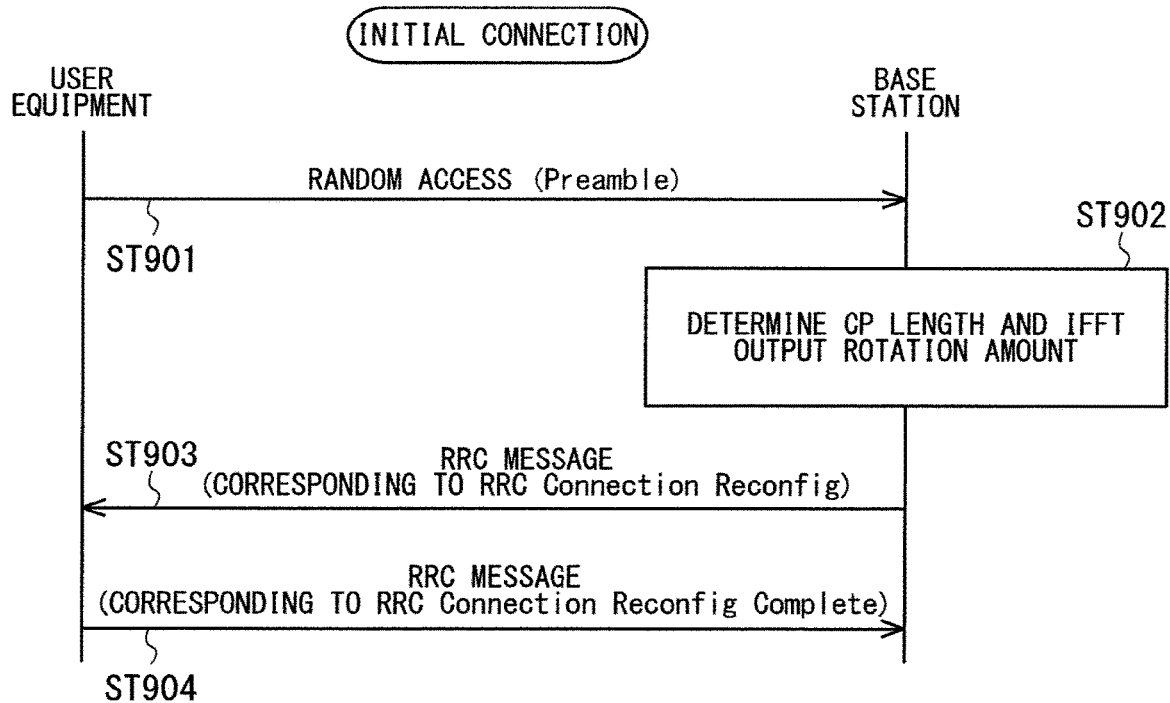
FIG. 9 is a sequence diagram illustrating an example of controlling a rotation amount of the IFFT output by using an RRC message according to the first embodiment.

Further detailed description will be given with reference to FIG. 9. When the user equipment performs random access in Step ST901, the base station that has received the random access determines the rotation amount of the IFFT output for each user equipment in Step ST902. Specifically, when a demodulation reception head is set to a position deviated from a reference timing by A[ns] in the TA control, the rotation amount is determined to be an amount corresponding to {CP length of radio format to which IFFT output rotation is applied}-{A[ns]}.

In Step ST903, the base station notifies the user equipment of a result of the determination of the rotation amount. In Step ST904, the user equipment that has received the result notification transmits a signal corresponding to RRC Connection Reconfig Complete to the base station. After the base station confirms that the base station has received the signal corresponding to RRC Connection Reconfig Complete from the user equipment, the base station notifies the user equipment of the rotation amount of the IFFT output through the following communication.

Here, when the rotation amount of the IFFT output is recognized differently between the user equipment and the base station, communication quality is reduced. However, when communication can be secured even with such reduced communication quality, the rotation of the IFFT output may be used from Step ST903.

As can be understood from the description above, similar effects can be achieved when a "difference between the demodulation reception head and the reference timing in the TA control" is specified, instead of specifying "the rotation amount of the IFFT output." Therefore, "the rotation amount of the IFFT output" or a "target amount of the difference between the demodulation reception head and the reference timing in the TA control" is notified along with the TA control, the TA control and the control of rotating the IFFT output can be simultaneously processed, and processing is facilitated when each control amount is changed.

(1d) Although the above-mentioned (1c) illustrates an example in which the rotation amount of the IFFT output is set by using an RRC message, it is also effective to set by using a control signal of L 1 accompanying with a message, such as a physical downlink control channel (PDCCH) and a physical uplink control channel (PUCCH). According to this, the rotation amount of the IFFT output can be changed for each unit such as a subframe and a slot, i.e., for each unit of data for transmitting PDCCH and PUCCH, and thus finer control is enabled.

Figure 10:
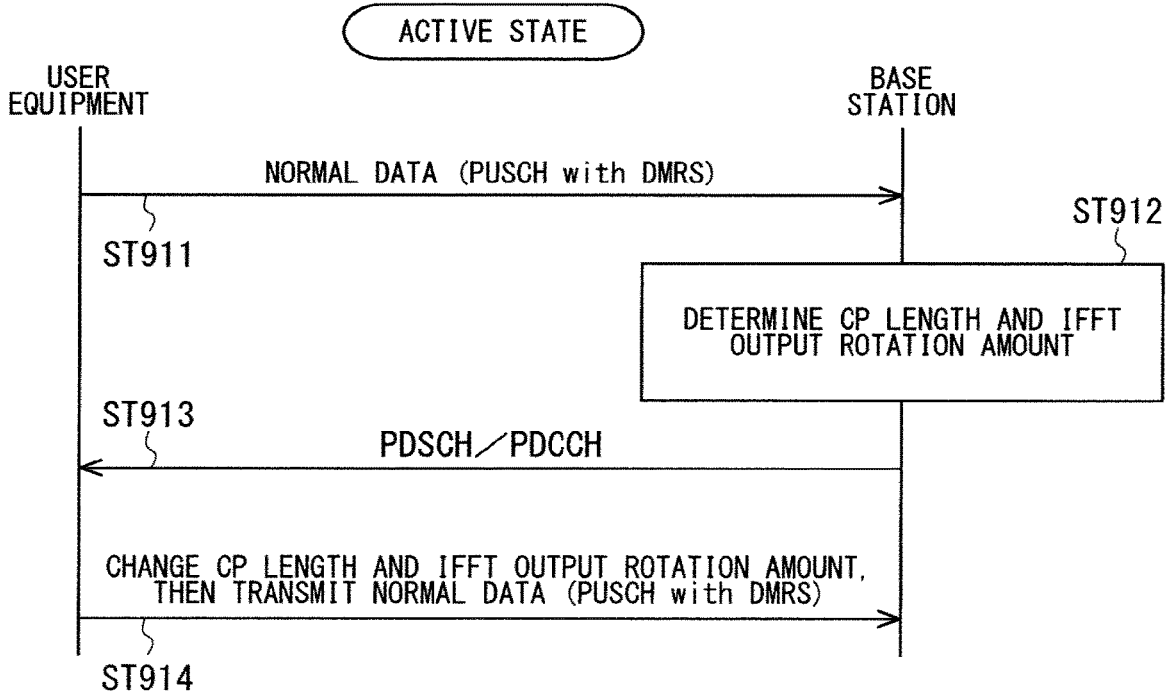
FIG. 10 is a sequence diagram illustrating an example of controlling the rotation amount of the IFFT output by using a control signal accompanying with a message such as PDCCH according to the first embodiment.

FIG. 10 illustrates an example in which the TA control is performed at a low speed, and the demodulation reception window set by the TA control is actually transmitted from the user equipment. In a case where the demodulation reception window is deviated from the head of CP of the transmission data, when the user equipment transmits a known sequence, such as a demodulation reference signal (DMRS) transmitted together with PUSCH, in Step ST911, the base station detects the deviation of arrival time from the known sequence in Step ST912. Then, in Step ST913, the base station notifies the user equipment of correct information of the rotation amount of the IFFT output by using PDCCH. In Step ST913, the rotation amount for the IFFT output of every case may be notified to the user equipment. Alternatively, a deviation amount (a rotation amount+Δ, or −Δ) with respect to the rotation amount set at the time of the TA control (i.e., {CP length of radio format to which IFFT output rotation is applied}−{A[ns]}) may be notified. According to this, information bits can be reduced. The user equipment performs demodulation of PDSCH in accordance with the PDCCH of Step ST913.

<1-2>

Another technology for solving the problems described above is provided below. Specifically, a technology of rotating an OFDM symbol (i.e., IFFT output) in advance to eliminate phase rotation in the reception window head in the receiver to thereby be capable of securing communication quality without providing an additional function such as phase correction is provided. Further, a technology of dynamically changing the CP length depending on a state of a radio channel between the base station and the user equipment or depending on a combination of the user equipments instantly handled by the base station to thereby enhance throughput not only by eliminating phase rotation in the reception window head but also by reducing overhead is provided.

(2) A method of managing and controlling the CP length, not managing and controlling the rotation amount of the IFFT output will be described. When the rotation amount of the IFFT output is ½ of the CP length, a margin of the reception window can be equally secured when the user equipment and the base station either approach each other or move away from each other. In view of this, an example of managing and controlling on the assumption that a difference between a reference timing and the demodulation reception window is ½ of the CP length is illustrated. This is particularly effective when TA is not performed as in a downlink signal.

(2a) As the CP length, a value stored in the non-volatile memory of the base station as a system parameter is used. Note that the CP length may be specified by the OAM server, or may be specified by an RRC message (e.g., a signal corresponding to RRC Connection Reconfig). The base station rotates the IFFT output by an amount corresponding to time that is ½ of the CP length at the time of transmission processing.

In this case, it is more effective when the base station notifies the user equipment of the CP length as a system parameter through broadcast information. The user equipment adjusts the position of the reception window by an amount corresponding to time that is ½ of the CP length obtained from the base station, and then performs demodulation.

Further, when the user equipment performs transmission to the base station, the user equipment rotates the IFFT output by time that is ½ of the above-mentioned CP length obtained from the base station, and then performs transmission. Note that the rotation amount at the time of transmission from the base station and the rotation amount at the time of transmission from the user equipment may be equal to each other.

(2b) Although the above-mentioned (2a) illustrates an example in which the CP length is directly specified, the CP length may be specified by an index value (an indicator) that can associate various radio formats generated due to a difference between the OFDM symbol rates or the like. Because the CP length is individually defined in various radio formats, the above-mentioned index value is set such that the same CP length can be derived in both the base station and the user equipment. The IFFT output is rotated by time that is ½ of the CP length obtained from the index value.

In the description above, the rotation amount of the IFFT output is set to ½ of the CP length. This setting is achieved mainly in view of a change margin of a data transmission timing generated due to obscurity as to in which direction among an approaching direction and a moving-away direction the user equipment is to move. Therefore, the rotation amount of the IFFT output need not be exact ½ of the CP length, and similar effects can also be achieved with a value around exact ½ of the CP length. Specifically, it suffices that the rotation amount of the IFFT output be a value within an allowable range including exact ½ of the CP length, i.e., a value substantially equal to ½ of the CP length.

(2c) Although the above-mentioned (2a) illustrates an example in which the CP length is set by using an RRC message, it is also effective to set by using a control signal of L1 accompanying with a message, such as PDCCH and PUCCH. According to this, the CP length can be changed for each unit of data to be transmitted, and thus finer control is enabled.

For example, the CP length itself is reduced when successive transmission is performed for the same user equipment, and the CP length itself is increased when successive transmission is not performed. In this manner, overhead can be reduced. Also in this example, the IFFT output can be rotated in accordance with the change of the CP length.

(3) Although the above-mentioned (2) illustrates an example in which the rotation amount of the IFFT output is ½ of the CP length, it is more effective to adjust the CP length in consideration of the distance between the user equipment and the base station, and set the rotation amount of the IFFT output to ½ of the adjusted CP length. A sequence of such a case is basically the same as FIG. 9 and FIG. 10 described above, and thus will be described with reference to FIG. 9 and FIG. 10.

When the base station receives a signal from the user equipment, the base station calculates delay time of a reception signal by using a known sequence in the reception signal, and calculates the distance between the user equipment and the base station based on the obtained delay time (Steps ST902 and ST912). Here, for example, the known sequence refers to a preamble of random access transmitted from the user equipment in Step ST901, or DMRS transmitted together with PUSCH from the user equipment in Step ST911. After that, when the base station confirms a response from the user equipment in Steps ST904 and ST914, the base station applies the rotation amount of the IFFT output. Note that the same sequence is applied in (4) to (6) described below.

(3a) The distance between the user equipment and the base station is taken into considered with reference to the following formula, for example. Specifically, {reception window head in stationary state}+{distance between user equipment and base station}/{speed of radio wave}={CP length to be set}.

Here, the reception window head in a stationary state is equal to that of the above-mentioned (2), and is approximately ½ of the CP length, for example. The distance between the user equipment and the base station is longer as the user equipment further moves away from the base station, which increases the reception window head to be larger than ½ of the CP length. Consequently, even when a signal from the user equipment arrives late, phases in every frequency at the head of the demodulation reception window match.

(3b) The distance between the user equipment and the base station may be measured by using the global positioning system (GPS). Also in this case, the rotation amount of the IFFT output is set similarly to the above-mentioned (3a).

(4) Although the above-mentioned (2) illustrates an example in which the rotation amount of the IFFT output is ½ of the CP length, it is more effective to adjust the CP length in consideration of a moving speed and a moving direction of the user equipment, and set the rotation amount of the IFFT output to ½ of the adjusted CP length.

(4a) The moving speed and the moving direction of the user equipment are taken into considered with reference to the following formula, for example. Specifically, {reception window head in stationary state}+{controllable cycle such as RRC/L1}×{speed at which user equipment moves away from base station}/{speed of radio wave}={CP length to be set}.

Here, the reception window head in a stationary state is equal to that of the above-mentioned (2), and is approximately ½ of the CP length, for example. Further, the controllable cycle is approximately average time required to transmit an RRC message when the rotation amount of the IFFT output is controlled by RRC, and substantially has the same order of magnitude of approximately 100 ms. When the rotation amount of the IFFT output is controlled by LI control, depending on the radio format, the controllable cycle is average time required for retransmission of HARQ for controlling L1 the fastest, and substantially has the same order of magnitude of approximately 1 to 10 ms.

It is known that the speed at which the user equipment moves away from the base station can be calculated from a frequency of a reception carrier wave and a phase rotation speed of a known signal, for example (Doppler frequency). Specifically, the speed at which the user equipment moves away from the base station can be calculated from the following formula.

$2\pi \times$ {phase rotation amount in unit}×{speed of radio wave}/{frequency of reception carrier wave}.

According to this (4a), the reception window head is increased to be larger than ½ of the CP length. Consequently, even when the user equipment moves away from the base station and a signal from the user equipment arrives late, phases in every frequency at the head of the demodulation reception window match.

It is more effective when this (4a) is applied to the above-mentioned (3) at the same time.

(4b) The moving speed and the moving direction of the user equipment may be measured by using GPS. Also in this case, the rotation amount of the IFFT output is set similarly to the above-mentioned (4a).

(5) Although the above-mentioned (2) to (4) illustrate an example in which the head position of the demodulation reception window is approximately ½ of the CP length, the demodulation reception window may be determined in consideration of delay distribution due to a multipath. Here, reception in the user equipment will be described.

Figure 11:
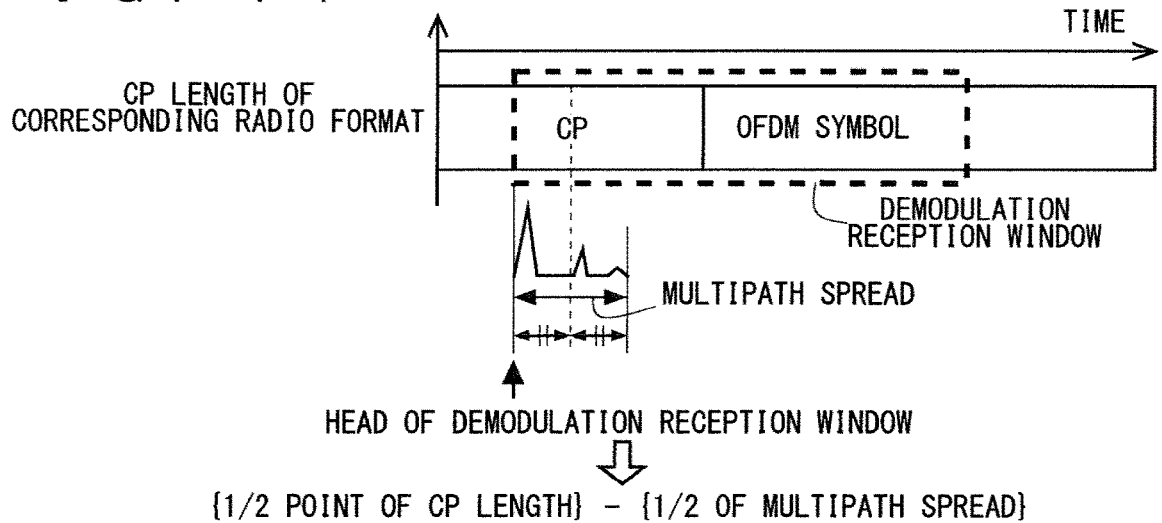
FIG. 11 is a diagram illustrating controlling of the demodulation reception window in consideration of multipath spread under a state of a multipath according to the first embodiment.

(5a) When an obstruction or a reflecting object exists between the base station and the user equipment, communication between the base station and the user equipment is communication with a plurality of paths (i.e., a multipath), which is different from communication with only one path in a free space. A state of the multipath is illustrated in FIG. 11.

The multipath is an effective signal, and thus when arrival time of all signals from a signal arriving early to a signal arriving late falls within the range of the CP length, a signal-to-noise-ratio (SN ratio) is improved. Therefore, it is effective to deviate the head of the demodulation reception window by an amount corresponding to ½ of multipath spread from ½ of the CP length in a forward direction. In this case, the rotation amount of the IFFT output is increased by an amount corresponding to ½ of the multipath spread. Consequently, phases in every frequency at the head of the demodulation reception window match.

Figure 12:
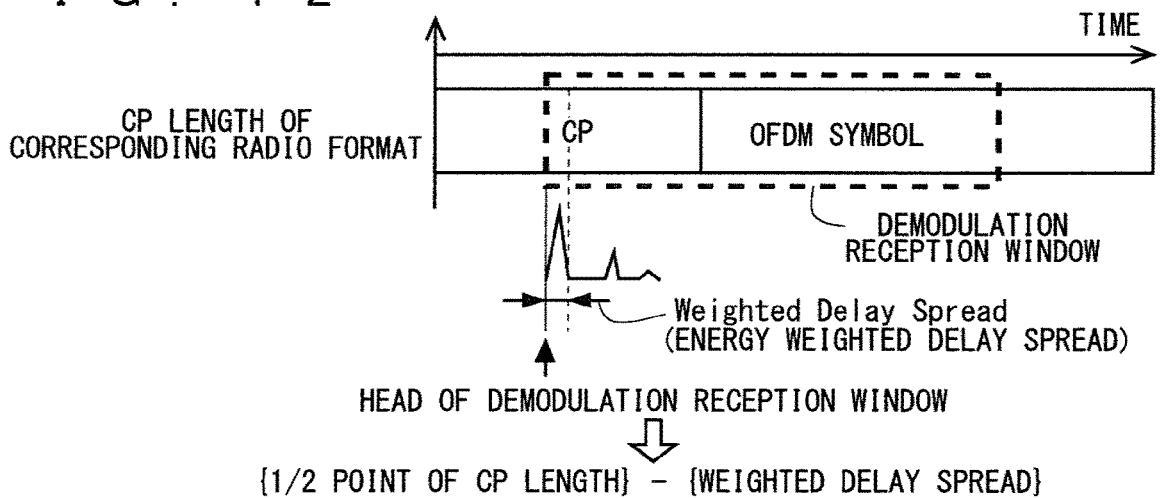
FIG. 12 is a diagram illustrating controlling of the demodulation reception window in consideration of weighted multipath spread under a state of a multipath according to the first embodiment.

The above-mentioned (5b) illustrates an example in which the demodulation reception window is controlled to be deviated by an amount corresponding to ½ of the multipath spread in the forward direction. In contrast, it is also effective to employ a method of deviating the head of the demodulation reception window by an amount corresponding to delay spread weighted by delay distribution or a reception level from ½ of the CP length in the forward direction, and rotating a larger amount of the IFFT output in accordance with this deviation amount (see FIG. 12). According to this method, in an environment having large path spread, phases in every frequency at the head of the demodulation reception window match on average. An example for explaining the weighted delay spread is illustrated in Table 1.

TABLE 1

| Delay time (ns) | Electric power (dB) | Electric power (true value) |
|---|---|---|
| 0 | 0 | 0 |
| 200 | −0.9 | 0.813 |
| 800 | −4.9 | 0.324 |
| 1200 | −8 | 0.158 |
| 2300 | −7.8 | 0.166 |
| 3700 | −23.9 | 0.004 |

According to the example of Table 1, the weighted delay spread is calculated as below.

Figure 13:
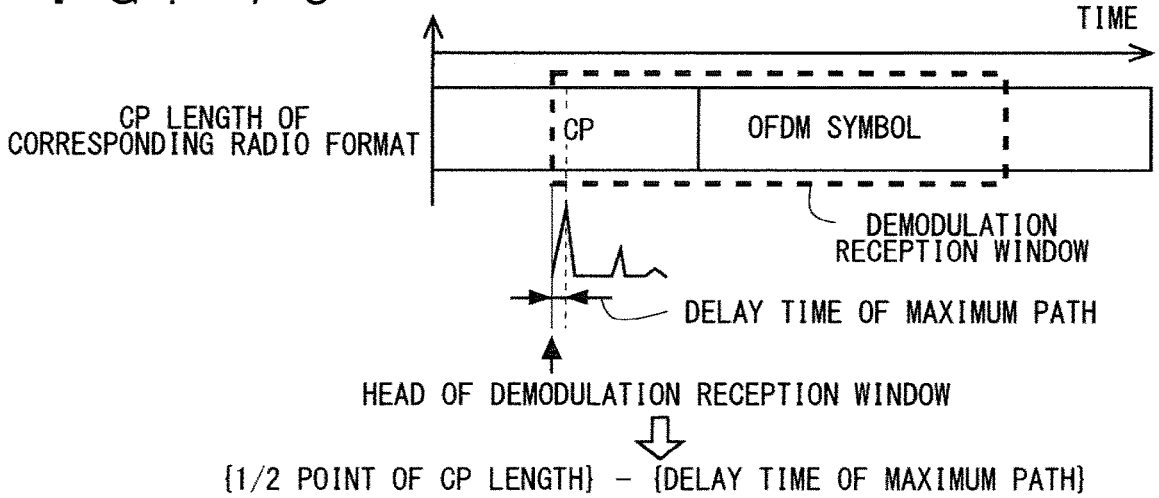
FIG. 13 is a diagram illustrating controlling of the demodulation reception window in consideration of delay time of a maximum path under a state of a multipath according to the first embodiment.

0×0+200×0.813+800×0.324+1200×0.158+2300×0.166+3700×0.004=409 ns (5c) The above-mentioned example illustrates an example in which the demodulation reception window is controlled to be deviated by an amount corresponding to ½ of the multipath spread in the forward direction. In contrast, it is also effective to employ a method of controlling the demodulation reception window such that the delay time of a maximum path is at the position of ½ of the CP length when communication is performed in an area mainly having an open environment and electric power of the maximum path is larger than electric power of other paths (see FIG. 13). In other words, the head of the demodulation reception window is deviated by an amount corresponding to the delay time of the maximum path from ½ of the CP length in the forward direction. Also in this case, a larger amount of the output IFFT is rotated in accordance with a difference between the head of the demodulation reception window and the position of ½ of the CP length. Here, the above-mentioned open environment refers to an open environment having no obstruction between the base station and the user equipment and in which the base station and the user equipment can be directly seen from each other, and is generally referred to as a line of sight (LOS). Further, examples of the area mainly having an open environment include an environment having few buildings or the like, such as an rural area.

(6) A technology of determining the rotation amount of the IFFT output in consideration of a variable margin of the reception window head position in a counter device (i.e., a receiving device) will be described below. In this case, the rotation amount of the IFFT output may be determined in consideration of an available variable margin of the reception window head position.

Specifically, when {CP length derived from methods of above-mentioned (2a) to (2c)}<{variable margin of reception window head position of counter device}, an amount of the IFFT output corresponding to ½ of the CP length is rotated. In contrast, when {CP length derived from methods of above-mentioned (2a) to (2c)}>{variable margin of reception window head position of counter device}, an amount of the IFFT output corresponding to {variable margin of reception window head position of counter device}/2 is rotated.

As a value of the variable margin of the reception window head position, information notified of as user equipment capability or base station capability by using an RRC message may be used. Here, for example, the RRC message corresponds to RRC Connection Reconfig transmitted from the base station to the user equipment to correspond to a Bearer Setup request from MME, or corresponds to RRC Connection Reconfig with which a handover command is transmitted at the time of handover.

<1-3>

From the description above, for example, the first embodiment provides a communication system including a base station device, and a communication terminal device configured to perform radio communication with the base station device. The base station device and the communication terminal device when operating as a transmitting device rotate inverse fast Fourier transform (IFFT) output, and copy a last portion of the rotated IFFT output to a head of the rotated IFFT output as a cyclic prefix (CP) to thereby generate a transmission signal so that there is no phase rotation at a head of a demodulation reception window set in a receiving device.

Further, for example, the first embodiment provides a configuration in which a rotation amount of the IFFT output may be in coordination with at least one of a CP length that is a length of the CP, a head position of the demodulation reception window with respect to the CP, and a variable margin of the head position of the demodulation reception window.

Second Embodiment

In the second embodiment, an OFDM transmission method involving a plurality of user equipments, e.g., control of the head position of the reception window, will be described.

The base station simultaneously communicates with a large number of user equipments, and therefore the scale of the device can be reduced if function units can be integrated. For example, a low-cost configuration can be achieved if the function unit that performs OFDM demodulation (i.e., FFT) can be shared by all of the user equipments.

However, when every user equipment has a different head to be subjected to FFT, individual timing control is required, which complicates the device configuration. Especially when an OFDM demodulating unit is provided in a substrate different from a function unit that performs channel coding/decoding, control over a plurality of substrates is required, which complicates the control. For example, control in consideration of an integrated circuit (IC) to be used, control delay due to elongated wiring, a start-up procedure and an exceptional procedure due to insertion and extraction of a substrate, synchronization processing of a plurality of substrates, etc. is required.

<2-1>

In view of this, the second embodiment provides a technology for solving the problems as described above. Specifically, when the demodulation reception window cannot be matched in all OFDM symbols in a configuration of dividing an OFDM sub-carrier with the CP length different in each user equipment to use the OFDM sub-carrier, at least one of the rotation amount of the IFFT output and the CP length is controlled to match phases in every frequency at the head of the demodulation reception window in a unit of data such as a subframe or a slot. Control examples are illustrated below.

The base station determines which timing should be the head of the demodulation reception window for each component carrier (CC) based on (a) a set of corresponding radio formats, (b) a corresponding cell radius, or (c) corresponding maximum transmission electric power of the base station itself. The system parameters of the above-mentioned (a) to (c) are stored in the non-volatile memory of the base station, but may be specified by the OAM server. Alternatively, (d) a head value itself of the demodulation reception window may be specified directly by the system parameter.

Figure 14:
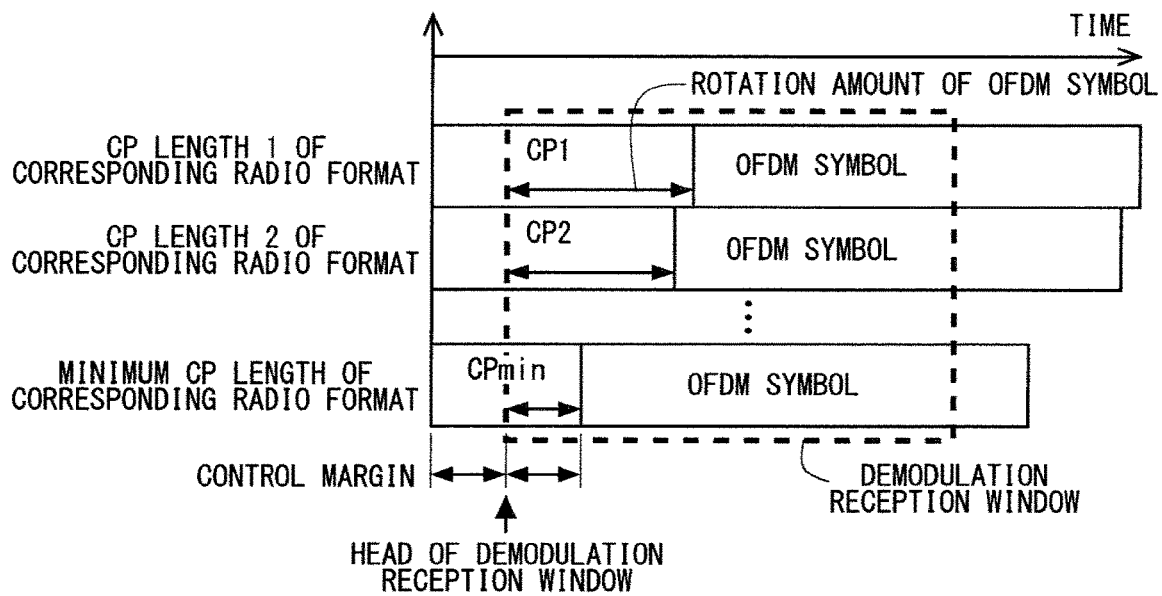
FIG. 14 is a diagram illustrating setting of approximately ½ of the shortest CP length to the head of the demodulation reception window according to a second embodiment.

Next, how to determine the head position will be described. When the corresponding radio formats include various CP lengths, it suffices that approximately ½ of the shortest CP length be set as the head of the demodulation reception window (see FIG. 14). Similarly to the first embodiment, the head of the demodulation reception window may be controlled in consideration of the distance between the base station and the user equipment, the moving speed and the moving direction of the user equipment, the channel state such as delay distribution, the capability of the device, etc.

Further, when the corresponding cell radius is also taken into consideration, it is effective to determine in the following manner (see FIG. 15 and FIG. 16). According to a calculation value obtained by {corresponding cell radius}/{speed of radio wave}/2, how much delay is generated when the radio wave is transmitted for a distance corresponding to twice the cell radius can be calculated. In other words, the delay required when the base station transmits a signal, the user equipment transmits a response signal in response to the transmission signal of the base station, and the response signal of the user equipment reaches the base station can be calculated from the formula above.

When the shortest CP length is represented by CPmin, the following formula is obtained.

$$CPmin > \{corresponding\ cell\ radius\}/\{speed\ of\ radio\ wave\}/2$$

Figure 15:
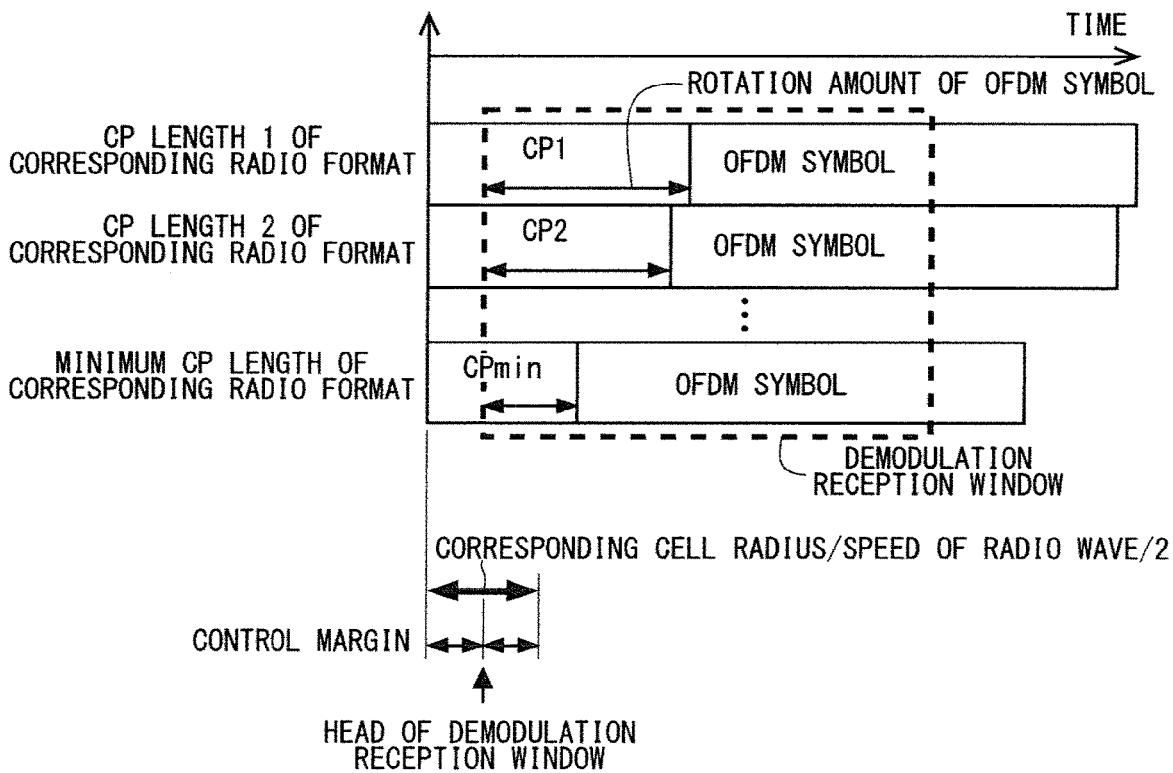
FIG. 15 is a diagram illustrating setting of the head of the demodulation reception window in a case of {shortest CP length CPmin}>{corresponding cell radius}/{speed of radio wave}/2 according to the second embodiment.
Figure 16:
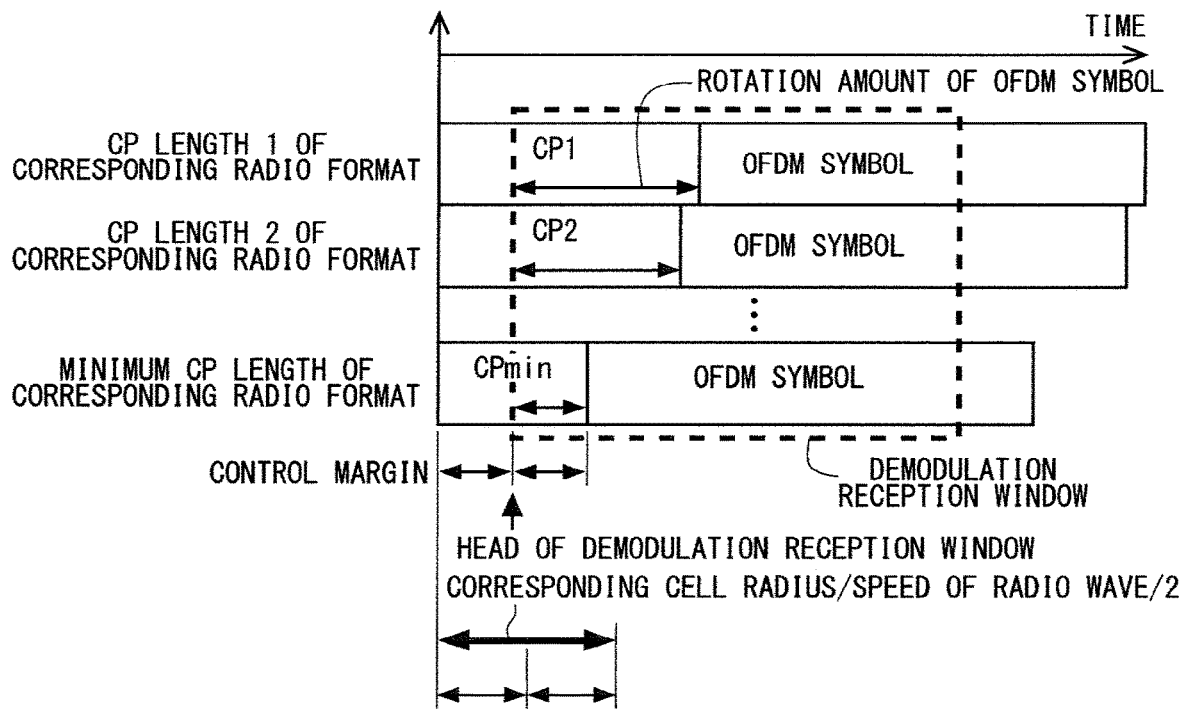
FIG. 16 is a diagram illustrating setting of the head of the demodulation reception window in a case of {shortest CP length CPmin}<{corresponding cell radius}/{ speed of radio wave}/2 according to the second embodiment.

In this case, it suffices that the demodulation reception window be set to approximately ½ of an amount of {corresponding cell radius}/{speed of radio wave}/2 (see FIG. 15). In contrast, $$CPmin < \{corresponding\ cell\ radius\}/\{speed\ of\ radio\ wave\}/2$$

in this case, it suffices that the demodulation reception window be set to approximately ½ of CPmin (see FIG. 16).

The user equipment rotates the IFFT output such that phases in every frequency at the specified head position of the reception window match by using the following PUSCH. A procedure for setting the above-mentioned head position will be described with reference to FIG. 17.

Figure 17:
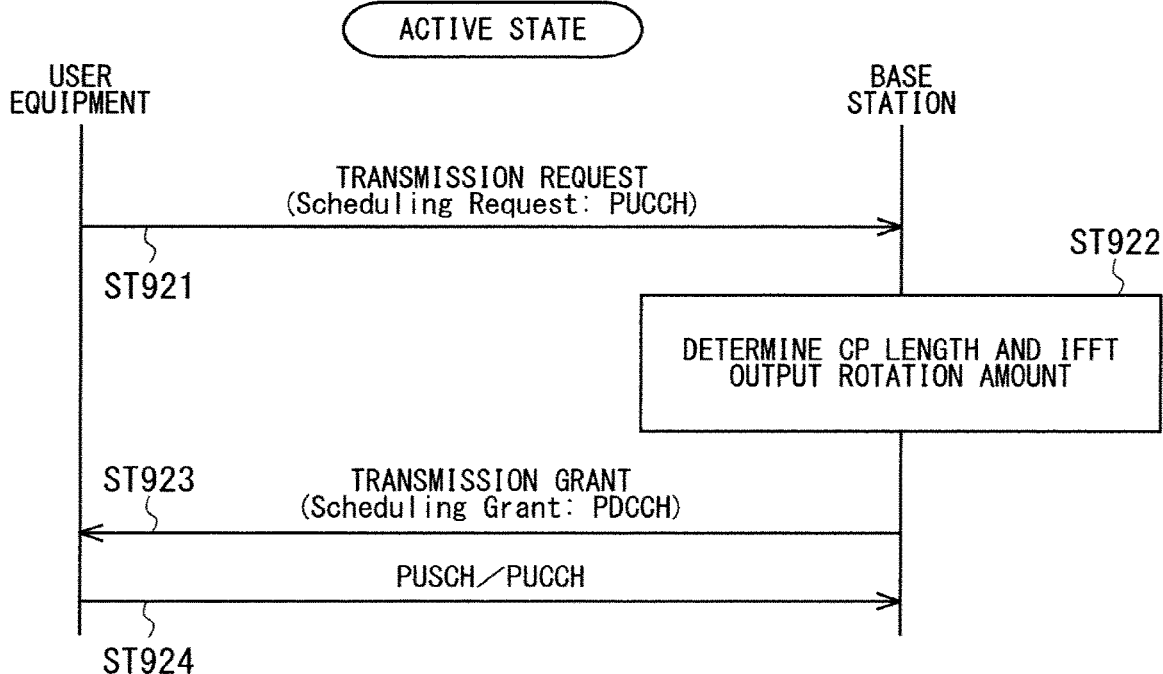
FIG. 17 is a sequence diagram illustrating a procedure for setting the head of the demodulation reception window according to the second embodiment.

When the head position of the reception window is set by using PUCCH (or PUSCH) being a control signal of L1 as illustrated in FIG. 17, if the base station is provided with a function of measuring a change in a propagation environment of a multipath, a function of measuring a change in the distance between the user equipment and the base station, or the like, such changes can be promptly handled.

When data to be transmitted to the base station occurs in the user equipment, the user equipment transmits PUCCH including a scheduling request (SR) in Step ST921. In Step ST922, the base station generates information (which may be hereinafter referred to as head position specifying information) of specifying the head position of the reception window in consideration of the radio formats of all of the user equipments made to transmit PUSCH in this case, such that the head positions of the reception windows of PUSCH in this case match. Here, the head position specifying information may be generated in consideration of the distance between the base station and each user equipment, the channel state between the base station and each user equipment, the moving speed and the moving direction of each user equipment, or the capability of each user equipment, instead of the above-mentioned radio formats of all of the user equipments.

Note that the head position of the reception window may be different for each set of the transmitting user equipments. Further, when communication is performed only with the user equipments close to the base station, it suffices that the CP length be short.

Next, in Step ST923, the base station transmits a scheduling grant (SG) signal for notifying of data transmission grant to the user equipments. In this case, it suffices that the head position specifying information of the reception window be added to the SG signal.

Figure 18:
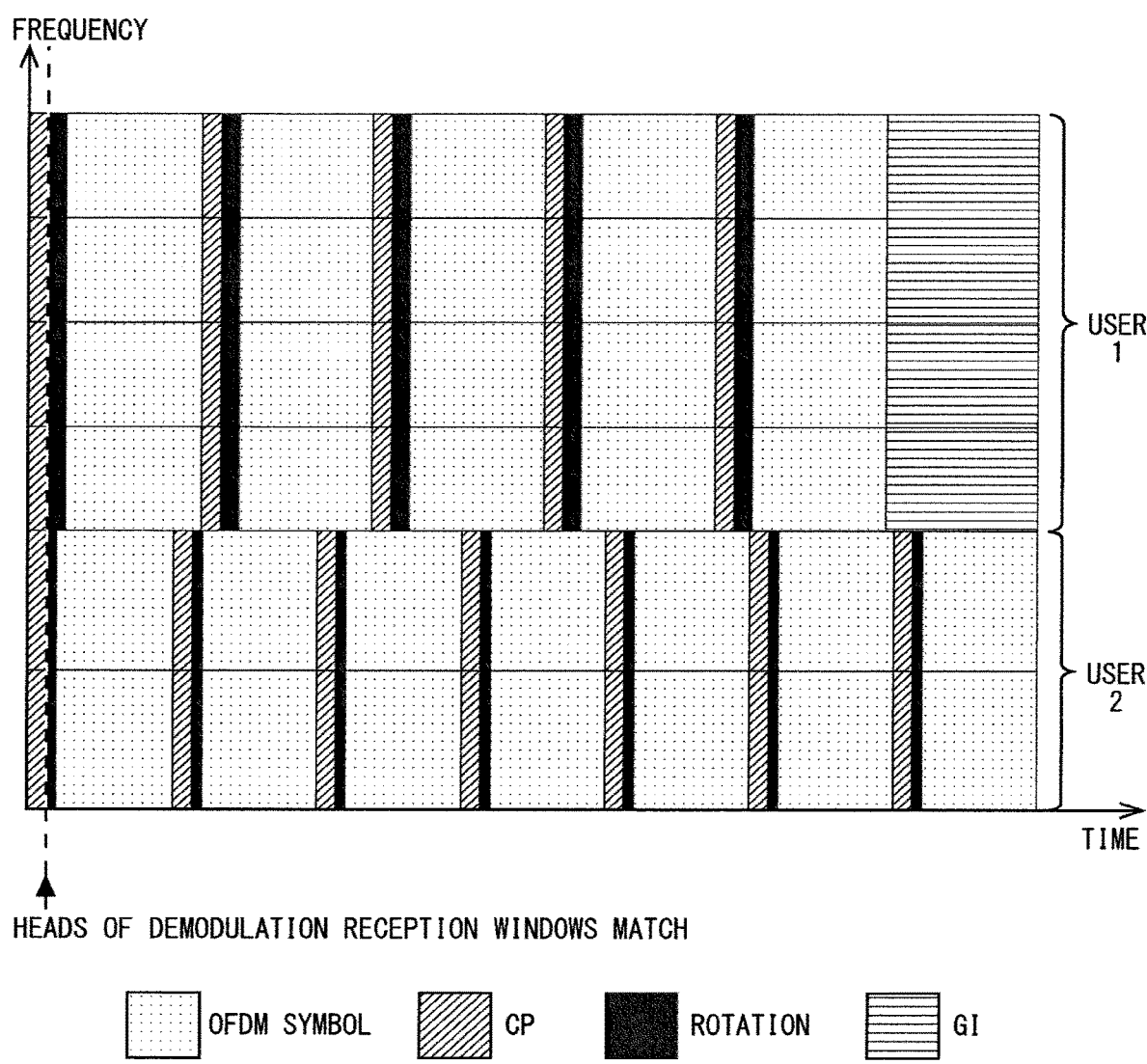
FIG. 18 is a diagram for illustrating matching of head positions of the demodulation reception windows of all of the user equipments according to the second embodiment.

Consequently, the head positions of the reception windows of all of the user equipments match. Particularly, the head positions of the reception windows of all of the user equipments match in a unit of data such as a subframe or a slot. Therefore, when the reference signal such as DMRS and the control information such as PUCCH are provided at the head of a unit of data, processing can be performed from the head without storing a plurality of symbols, and thus this is effective. Refer to FIG. 18.

Further, when the CP length is also transmitted with SG, if communication is performed only with the user equipments close to the base station, the CP length can be reduced as well. Therefore, overhead can be reduced, and thus this is effective. Specifically, also when the IFFT output is not rotated and the head position specifying information of the reception window is not transmitted, the head positions of the reception windows can be matched by transmitting only the CP length, and thus this is effective.

Figure 19:
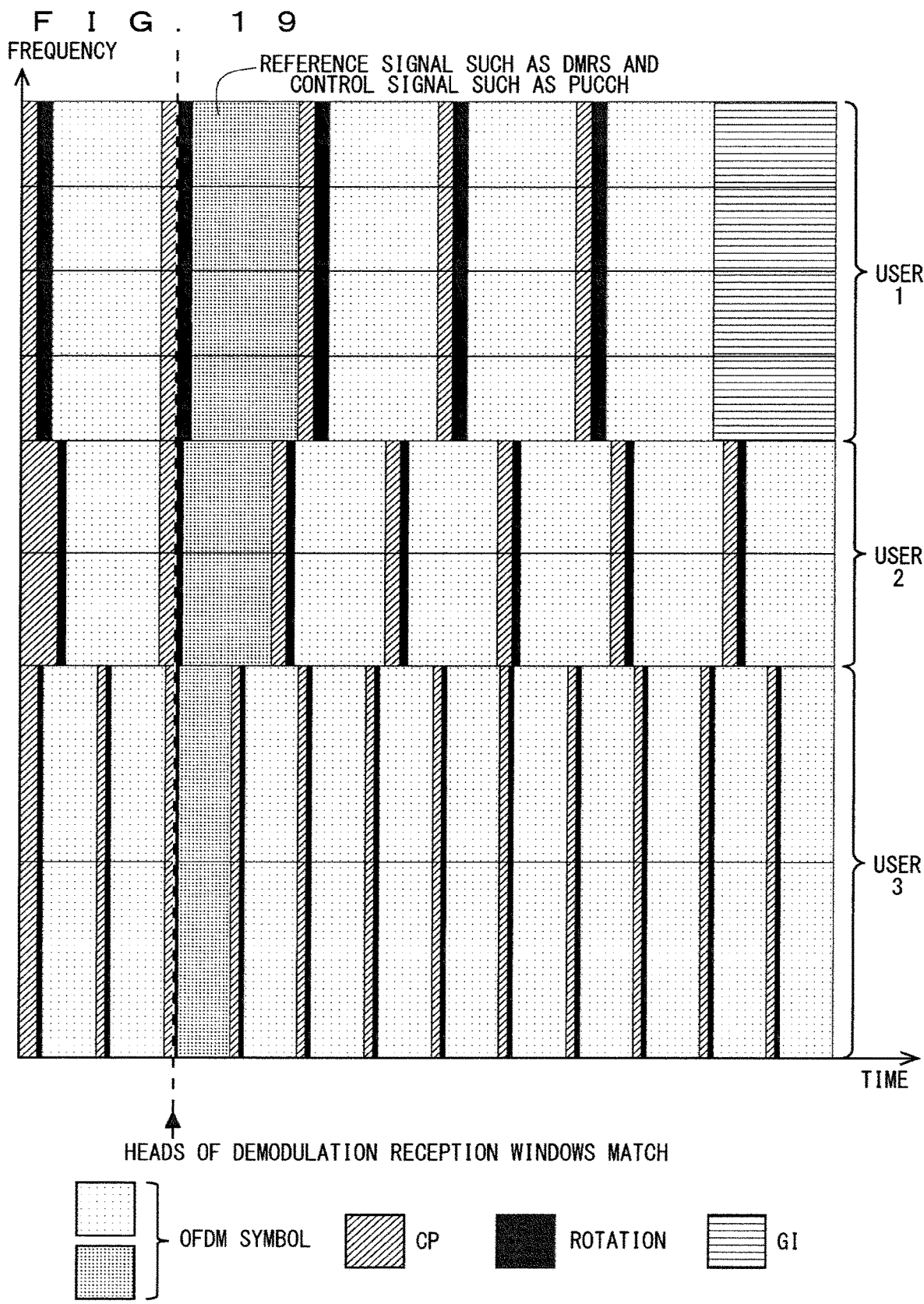
FIG. 19 is a diagram illustrating matching of the head positions of the demodulation reception windows for a reference signal such as DMRS and control information such as PUCCH according to the second embodiment.

In contrast, when the reference signal such as DMRS and the control information such as PUCCH are provided at a portion other than the head of the unit of data such as a subframe or a slot, as illustrated in FIG. 19, it suffices that the head positions of the reception windows for those signals be matched.

Even in a system in which an tolerable phase error s large and the IFFT output rotation is not required, when the heads of the OFDM symbols immediately after CP are matched, the head positions of the reception windows match, and the processing is facilitated.

Here, it suffices that SR itself transmitted by the user equipment (see Step ST921) be a unit that can have the same positions of the reception windows by sharing a time slot with SRs of other user equipments, for example. SR is transmitted before adjustment with the base station is performed (see Step ST921), and thus the IFFT output is rotated by an amount corresponding to a fixed value such as the same CP length or ½ of the CP length, for example.

<2-2>

Figure 20:
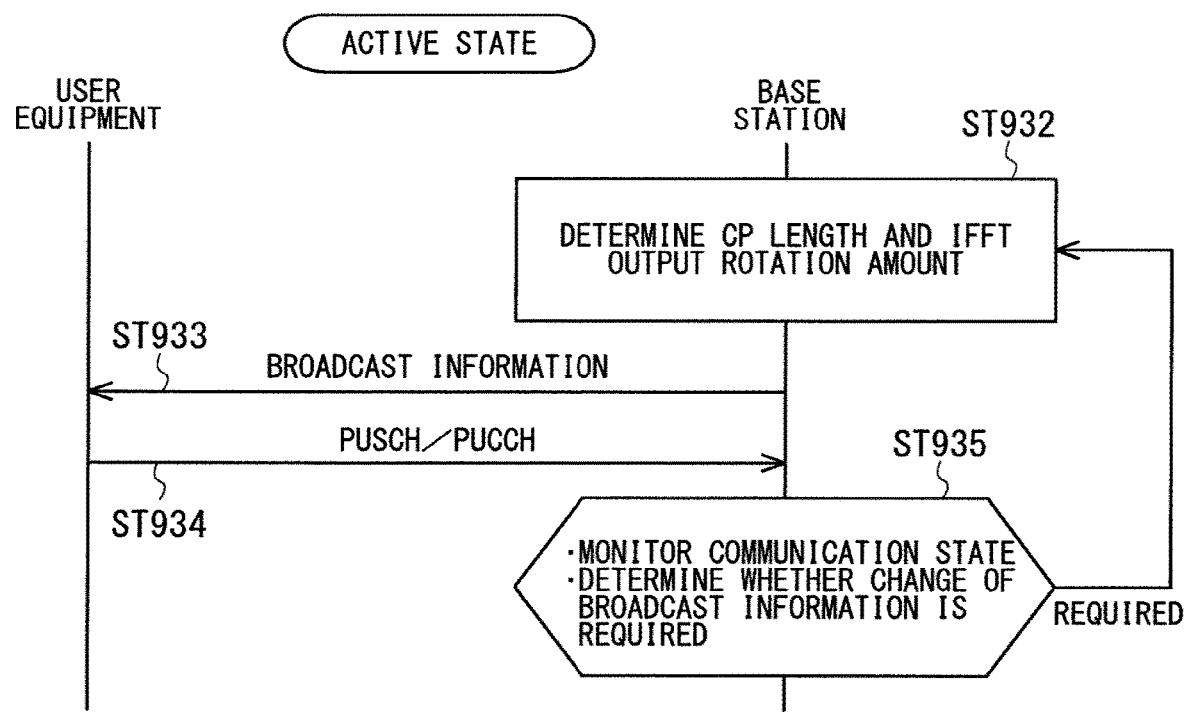
FIG. 20 is a sequence diagram illustrating an example in which the user equipment performs communication without SR/SG according to the second embodiment.

An example in which the user equipment performs communication without SR/SG will be described below with reference to FIG. 20.

In Step ST932, the base station performs grouping at a necessary timing for each cell, each beam, or each CC depending on a communication state of the user equipments served by the base station, or the distance or the position with respect to the base station, to determine the CP length and the IFFT output rotation amount. Then, in Step ST933, the base station notifies the user equipments of the information determined in Step ST932 by using broadcast information (an RRC message) or PDCCH of each group. In Step ST934, the user equipments rotate the IFFT output such that phases in every frequency at the head position of the reception window of the base station match in accordance with the information notified of from the base station, and perform transmission. In Step ST935, the base station monitors the communication state with each user equipment, and determines whether a change of groups or a change of the CP length and the IFFT output rotation amount for each group is required. When the base station determines that a change is required, the base station executes the above mentioned Step ST932.

Examples of group sorting will be described below.

In the first example, downlink groups are sorted depending on propagation delay time from the base station. Even when the rotation of the IFFT output is shared within a group, time equal to or longer than twice the propagation delay time is allocated to the CP length. According to this, the CP length can be reduced to be smaller than usual in the user equipments close to the base station, and thus throughput is enhanced.

In the second example, groups are sorted depending on whether successive transmission is performed. When data is successively transmitted, it is also effective to broadcast (i) the CP length or the head position specifying information of the reception window to be transmitted in the first time, and (ii) the CP length or the head position specifying information of the reception window to be transmitted in the second and subsequent times together to differ groups. The CP length to be transmitted in the second and subsequent times is controlled to a CP length corresponding to an amount in which a channel may be changed based on the first reception result. In accordance with this, the rotation amount of the IFFT output can be controlled. Consequently, overhead can be reduced.

In the third example, groups are sorted by first transmission and retransmission of HARQ. The CP length at the time of retransmission is controlled to a CP length corresponding to an amount in which a channel may be changed based on a reception result of the first transmission. In accordance with this, the rotation amount of the IFFT output can be controlled. Consequently, overhead can be reduced.

In the fourth example, groups are sorted depending on a change rate of the distance between the user equipments and the base station. The user equipments are sorted into some groups in view of the fact that the CP length and the IFFT output rotation amount are increased and decreased by an amount corresponding to a value obtained by {controllable cycle such as RRC/L1}×{speed at which user equipment moves away from base station}/{speed of radio wave}, to reduce the CP length of the terminals moving at a low speed. Consequently, overhead can be reduced, and throughput can be enhanced.

In the fifth example, groups are sorted depending on elapsed time since the last transmission, or a state corresponding to the elapsed time. The CP length when the elapsed time is short (in an active-state) can be controlled to a CP length corresponding to an amount in which a channel may be changed, as compared to the CP length when elapsed time is long (in an inactive-state). In accordance with that, the rotation amount of the IFFT output can be controlled. Consequently, overhead can be reduced.

The group sorting of the above-mentioned second to fifth examples can also be applied to uplink. In a case of uplink, it is more effective when the TA control is taken into consideration. Specifically, when a TA control cycle and accuracy of TA are taken into consideration, generation of a group having unnecessarily large CP length and IFFT output rotation amount can be prevented.

From the description above, for example, the second embodiment provides a communication system including a base station device, and a communication terminal device configured to perform radio communication with the base station device. The base station device and the communication terminal device when operating as a transmitting device rotate inverse fast Fourier transform (IFFT) output, and copy a last portion of the rotated IFFT output to a head of the rotated IFFT output as a cyclic prefix (CP) to thereby generate a transmission signal so that there is no phase rotation at a head of a demodulation reception window set in a receiving device. Particularly, when the base station device performs radio communication with a plurality of communication terminal devices, the base station device determines at least one of a rotation amount of the IFFT output and a CP length that is a length of the CP so that a head of the demodulation reception window for each of the plurality of communication terminal devices aligns in a defined unit of data concerning transmission data.

Further, for example, the second embodiment provides a configuration in which the base station device may sort the plurality of communication terminal devices into groups in accordance with a predetermined reference, and may determine at least one of the rotation amount of the IFFT output and the CP length for each of the groups.

Third Embodiment

In the third embodiment, an OFDM transmission method involving a plurality of user equipments, e.g., the use of a sounding reference signal (SRS), will be described.

In the 5G system, dividing one component carrier (CC) into a plurality of user equipments or a plurality of communication channels to use the CC through use of filtered-OFDM has been studied. In this case, transmission and reception are performed with various symbol rates, and thus when the uplink/downlink symbol number is dynamically changed, segmented positions do not match. Therefore, for example, when the transmitter and the receiver are located very close to each other at the time of transmitting an uplink sounding reference signal (SRS), SRS transmission time and data reception time may be the same timing. In such a case, a low noise amplifier (LNA) or the like may be broken due to excessive input in the receiver.

In the third embodiment, a method of enabling setting of a position of switching between uplink/downlink when filtered-OFDM is applied even with the problems as described above, and an SRS transmission method will be described.

<3-1>

The first example will be described below. In the first example, a position of stopping downlink transmission is specified as a symbol position in a channel having the longest symbol length in downlink CC (i.e., a channel having the smallest OFDM sub-carrier interval). Information of such a stopping position is notified by using an RRC message. Here, for example, the RRC message is broadcast information, or corresponds to RRC Connection Reconfig transmitted from the base station to the user equipment to correspond to a Bearer Setup request from MME, or corresponds to RRC Connection Reconfig with which a handover command is transmitted at the time of handover. In the signal of SRS, similarly to the existing 3GPP, randomization using a cell ID or the like as a key is performed so as to recognize to which cell the signal has been transmitted. Further, information about which user equipment transmits, information about a transmission timing, and information about a transmission frequency (a position of a sub-carrier) are specified together with the above-mentioned RRC, or by RRC Connection Reconfig for starting sounding.

As for a channel other than the channel having the longest symbol length (i.e., the channel having the smallest OFDM sub-carrier interval), it suffices that SRS be used in all symbols having a portion overlapping with the channel having the longest symbol length. Further, it suffices that a state of not performing transmission, i.e., a null state, be applied to a portion not overlapping with the channel having the longest symbol length of the symbols having a portion overlapping with the channel having the longest symbol length. Consequently, excessive input to another user equipment can be prevented.

Further, in this case, transmission may be stopped during one symbol.

Further, a GI section without uplink and downlink transmission may be longer than the OFDM symbol. Energy of SRS is increased, and estimation with good accuracy is enabled.

<3-2>

Although the description above illustrates an example in which the position of stopping downlink transmission is specified as a symbol position in a channel having the longest symbol length in downlink CC (i.e., a channel having the smallest OFDM sub-carrier interval), it is also effective to specify the position of stopping downlink transmission as a symbol position of a channel assigned at a center of CC, a channel for synchronization, or a broadcast channel.

Such a specifying method will be described as the second example with reference to FIG. 21. In filtered-OFDM, OFDM signals having different symbol rates are transmitted and received with the same CC. In this case, signals of a channel assigned at the center of CC can be separated by a low pass filter (LPF), whereas signals of other channels are required to be separated by a band pass filter (BPF). Specifically, the channel at the CC center can be easily separated. Therefore, the channel at the CC center is suitable for monitoring on a regular basis even in a state out of data communication (idle or in-active state). Therefore, when the position of stopping downlink transmission is determined with reference to the symbol length at the CC center, control with good accuracy is enabled.

Figure 21:
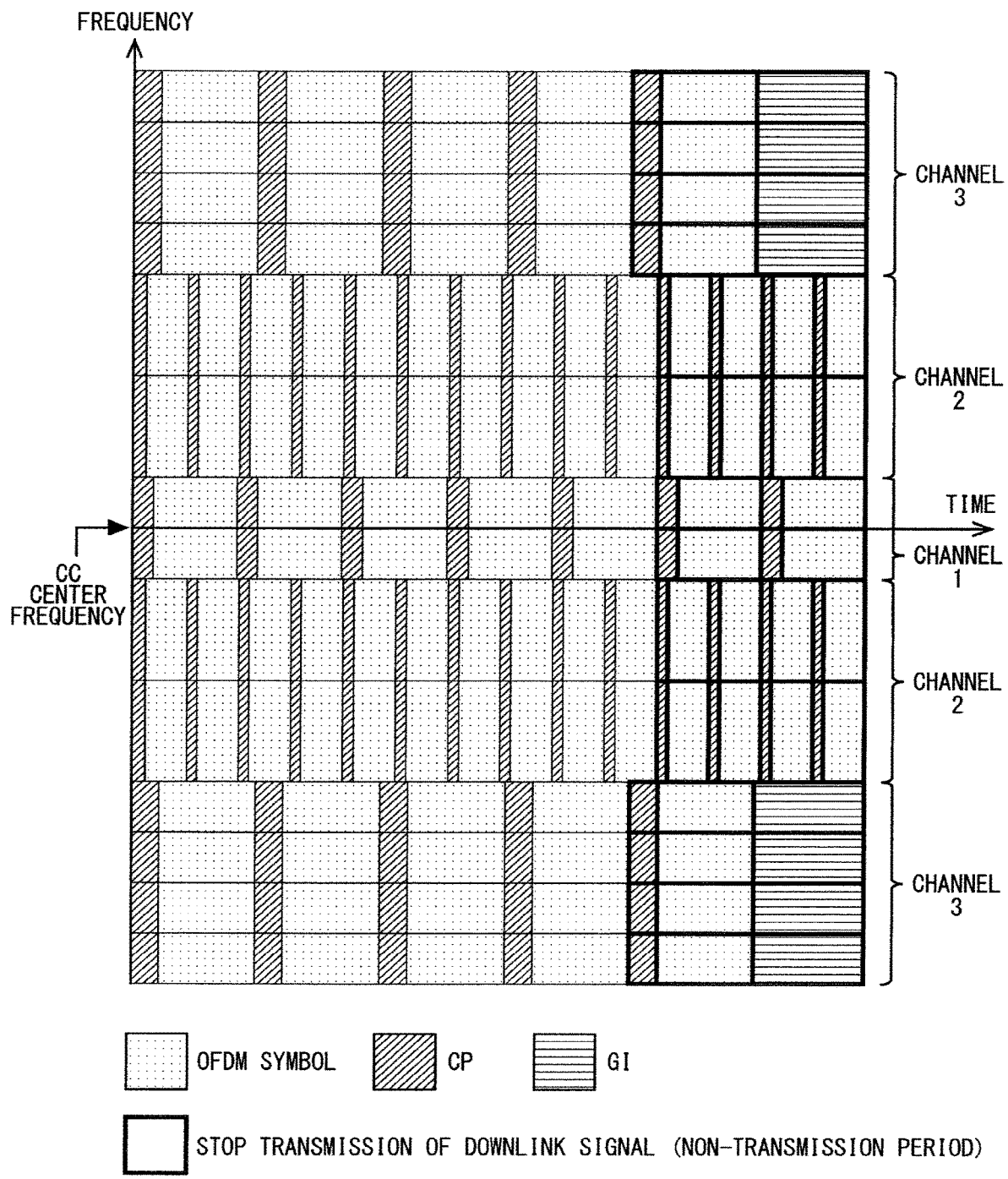
FIG. 21 is a diagram illustrating setting of a position of stopping downlink transmission in consideration of a channel assigned at a center of CC according to a third embodiment.

In FIG. 21, a channel 1 is assigned to a CC center frequency. The base station determines a cycle and a timing for not performing transmission based on the number of user equipments served by the base station, a communication state (e.g., uplink average data throughput), etc. FIG. 21 illustrates an example in which the 6th and 7th OFDM symbols in the channel 1 (see the symbols enclosed by the bold line) are determined as transmission stop time. Further, in other channels 2 and 3, transmission of all of the OFDM symbols temporally overlapping with the 6th and 7th OFDM symbols of the channel 1 (see the symbols enclosed by the bold line) is stopped.

Meanwhile, the user equipments served by the base station are notified of information about at which timing and cycle transmission is enabled by using an RRC message, e.g., broadcast information. Instead of a broadcast channel, a signal corresponding to RRC Connection Reconfig transmitted from the base station to the user equipment to correspond to a Bearer Setup request from MME, or a signal corresponding to RRC Connection Reconfig with which a handover command is transmitted at the time of handover may be used.

Alternatively, several candidates concerning at which timing and cycle transmission is enabled may be notified in advance, and which candidate will be used may be notified later. Specifically, the base station lists up the above-mentioned candidates, and notifies information of the candidates by using the above-mentioned RRC message in advance. After that, the base station notifies which format of the candidate will be used every time by using an L1 control information signal such as PDCCH assigned at the head (which may be at the second when there is DMRS at the head) of the OFDM symbol.

Figure 22:
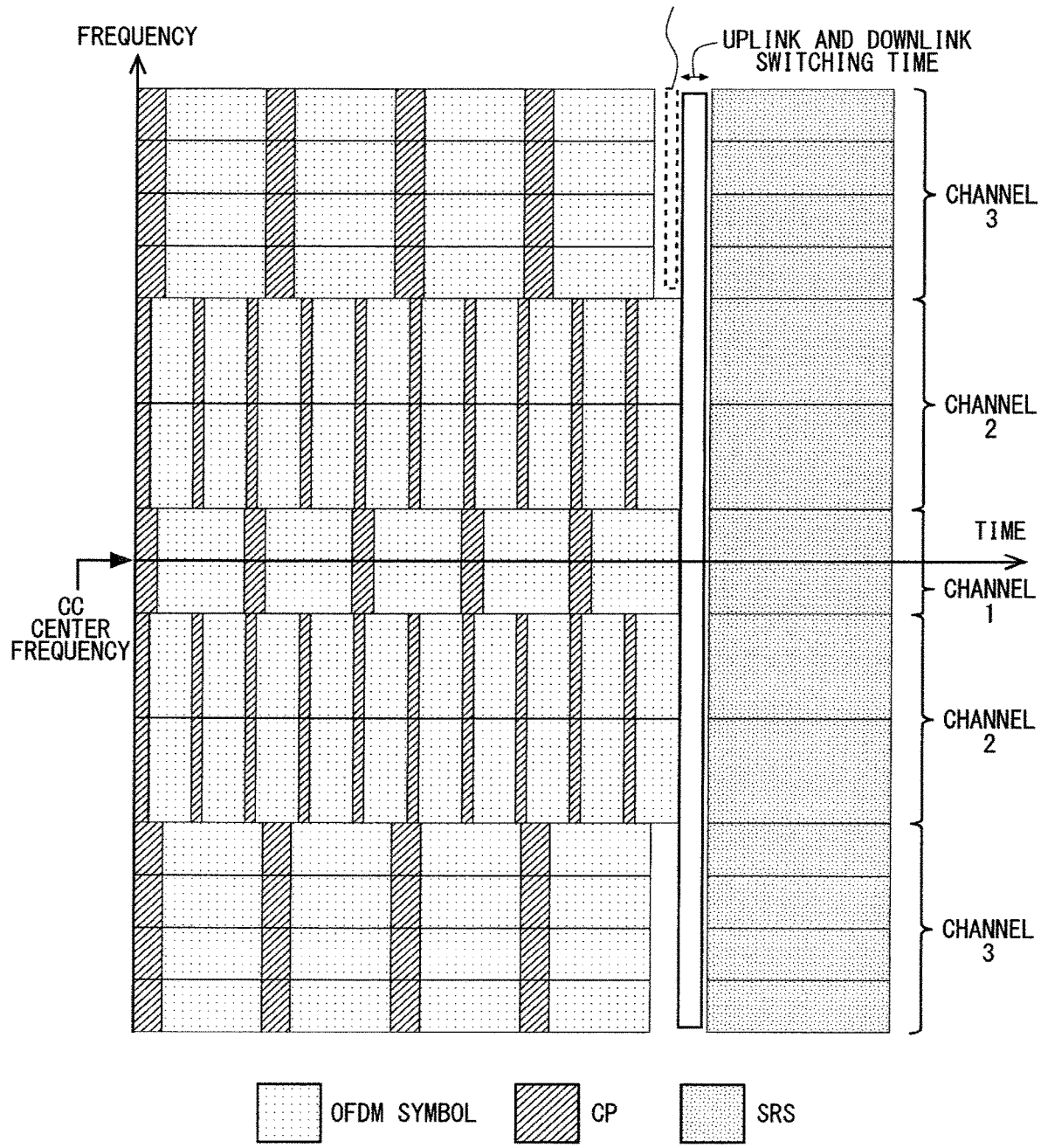
FIG. 22 is a diagram illustrating an example of transmitting SRS in a non-transmission period of FIG. 21 according to the third embodiment.

FIG. 22 illustrates an example in which the user equipment transmits a sounding reference signal (SRS) in a non-transmission period of FIG. 21. A period of SRS may be set to an integer multiple of an OFDM symbol length, and a remaining period may be set to a period in which transmission and reception are not performed as a gap interval (GI).

<3-3>

As illustrated in the example described above, SRS does not necessarily require one symbol length. In view of this, it is also effective to specify the position of stopping downlink transmission by using a multiple of a minimum unit time for transmitting SRS, instead of stopping a downlink signal at a symbol position of a channel having the longest downlink CC symbol length (i.e., a channel having the smallest OFDM sub-carrier interval) or a symbol position of a channel assigned at the center of CC. Particularly, it suffices that {uplink and downlink switching time}+{minimum unit time of uplink transmission}×n (n representing an integer) be specified as the stopping position of downlink transmission.

This example is effective when an uplink data amount is small, and downlink throughput is intended to be increased.

Figure 23:
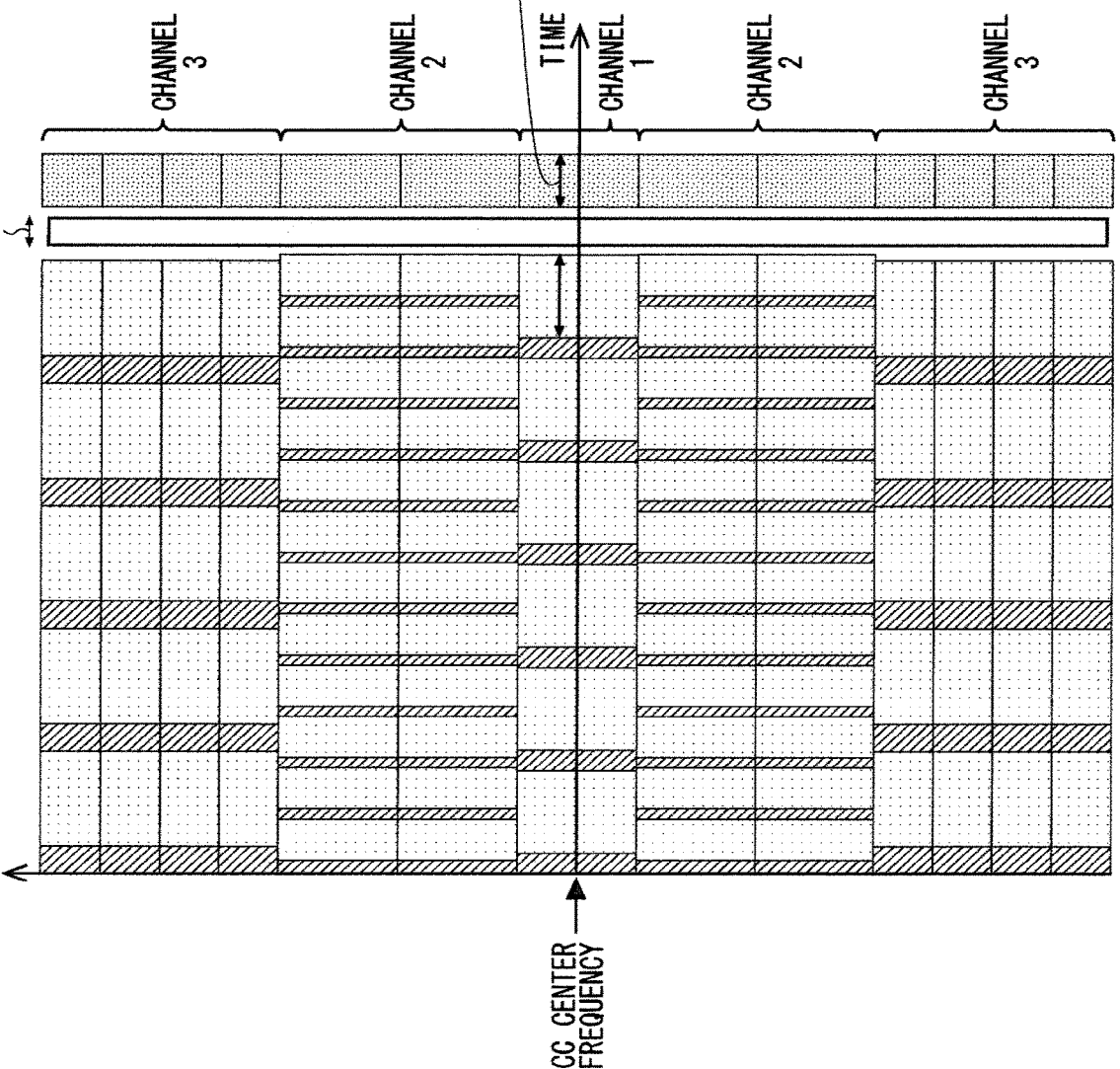
FIG. 23 is a diagram illustrating an example of setting SRS to ½ of an OFDM symbol length assigned at a center frequency of CC according to the third embodiment.

The uplink minimum unit time is determined by a trade-off between throughput improvement achieved by flexibility of control and complexity of control due to increase in a control information amount. For example, FIG. 23 illustrates an example that can correspond to ½ of the OFDM symbol length assigned at a center frequency of CC, and this can improve throughput.

The stopping position of downlink transmission may be specified by using RRC similarly to the above.

<3-4>

From the description above, for example, the third embodiment provides a communication system including a base station device, and a plurality of communication terminal devices configured to perform radio communication with the base station device. The base station device divides one component carrier (CC) into the plurality of user equipments or a plurality of communication channels to use the CC, and stops downlink transmission at at least one symbol position of a channel having a longest symbol length in downlink CC, a channel assigned at a center of the CC, a channel for synchronization, and a broadcast channel.

Further, for example, the third embodiment provides a configuration in which the plurality of communication terminal devices may transmit a sounding reference signal (SRS) while the downlink communication stops.

Modification

The embodiments and the modifications are merely illustrations of the present invention, and can be freely combined within the scope of the present invention. Any constituent elements of the embodiments and the modifications can be appropriately modified or omitted.

While the invention has been described in detail, the foregoing description is in all aspects illustrative and not restrictive. It is therefore understood that numerous modifications and variations can be devised without departing from the scope of the invention.

EXPLANATION OF REFERENCE SIGNS

200 communication system, 202 communication terminal device, 203 base station device

The invention claimed is:

1. A communication system comprising:
a base station device; and
a communication terminal device configured to perform radio communication with the base station device, wherein
the base station device and the communication terminal device when operating as a transmitting device rotate inverse fast Fourier transform (IFFT) output, and copy a last portion of the rotated IFFT output to a head of the rotated IFFT output as a cyclic prefix (CP) to thereby generate a transmission signal so that there is no phase rotation at a head of a demodulation reception window set in a receiving device.

2. The communication system according to claim 1, wherein
a rotation amount of the IFFT output is in coordination with at least one of a CP length that is a length of the CP, a head position of the demodulation reception window with respect to the CP, and a variable margin of the head position of the demodulation reception window.

3. The communication system according to claim 1, wherein
when the base station device performs radio communication with a plurality of communication terminal devices, the base station device determines at least one of a rotation amount of the IFFT output and a CP length that is a length of the CP so that a head of the demodulation reception window for each of the plurality of communication terminal devices aligns in a defined unit of data concerning transmission data.

4. The communication system according to claim 3, wherein
the base station device sorts the plurality of communication terminal devices into groups in accordance with a predetermined reference, and determines at least one of the rotation amount of the IFFT output and the CP length for each of the groups.

* * * * *